United States Patent
Takahashi et al.

(10) Patent No.: US 10,013,939 B2
(45) Date of Patent: *Jul. 3, 2018

(54) DISPLAY DEVICE AND CONTROL METHOD

(71) Applicant: Sharp Kabushiki Kaisha, Osaka-shi, Osaka (JP)

(72) Inventors: Kazuki Takahashi, Osaka (JP); Akizumi Fujioka, Osaka (JP); Taketoshi Nakano, Osaka (JP); Toshihiro Yanagi, Osaka (JP); Kouji Kumada, Osaka (JP); Noriyuki Tanaka, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 135 days.

This patent is subject to a terminal disclaimer.

(21) Appl. No.: 15/198,190

(22) Filed: Jun. 30, 2016

(65) Prior Publication Data
US 2016/0307530 A1    Oct. 20, 2016

Related U.S. Application Data

(63) Continuation of application No. 14/378,657, filed as application No. PCT/JP2013/053885 on Feb. 18, 2013, now Pat. No. 9,418,608.

(30) Foreign Application Priority Data

Feb. 24, 2012 (JP) .................. 2012-039296

(51) Int. Cl.
*G09G 3/36* (2006.01)
*G06F 3/147* (2006.01)
*G09G 3/20* (2006.01)
*G06F 3/12* (2006.01)
*G02B 15/173* (2006.01)

(52) U.S. Cl.
CPC .......... *G09G 3/3648* (2013.01); *G06F 3/147* (2013.01); *G09G 3/2096* (2013.01); *G09G 3/3611* (2013.01); *G09G 3/3618* (2013.01); *G02B 15/173* (2013.01); *G06F 3/1265* (2013.01); *G09G 2310/0291* (2013.01); *G09G 2310/061* (2013.01); *G09G 2310/08* (2013.01); *G09G 2320/043* (2013.01); *G09G 2330/021* (2013.01); *G09G 2330/022* (2013.01); *G09G 2330/027* (2013.01)

(58) Field of Classification Search
None
See application file for complete search history.

(56) References Cited

PUBLICATIONS

Takahashi et al., "Display Device and Control Method", U.S. Appl. No. 14/378,657, filed Aug. 14, 2014.

*Primary Examiner* — Joseph Haley
(74) *Attorney, Agent, or Firm* — Keating & Bennett, LLP

(57) ABSTRACT

A display device (1) in accordance with an embodiment of the present invention includes: an LCD driving section (20) and an LCD controller (30) for causing an image based on an image signal to be displayed on an LCD (10); and a CPU (40) for supplying an image signal to the LCD controller (30), the LCD controller (30) being configured to supply, to the CPU (40), a control signal that instructs the CPU (40) to supply an image signal, and the CPU (40) being configured to supply an image signal in a case where the CPU (40) receives a control signal.

20 Claims, 21 Drawing Sheets

F I G. 1
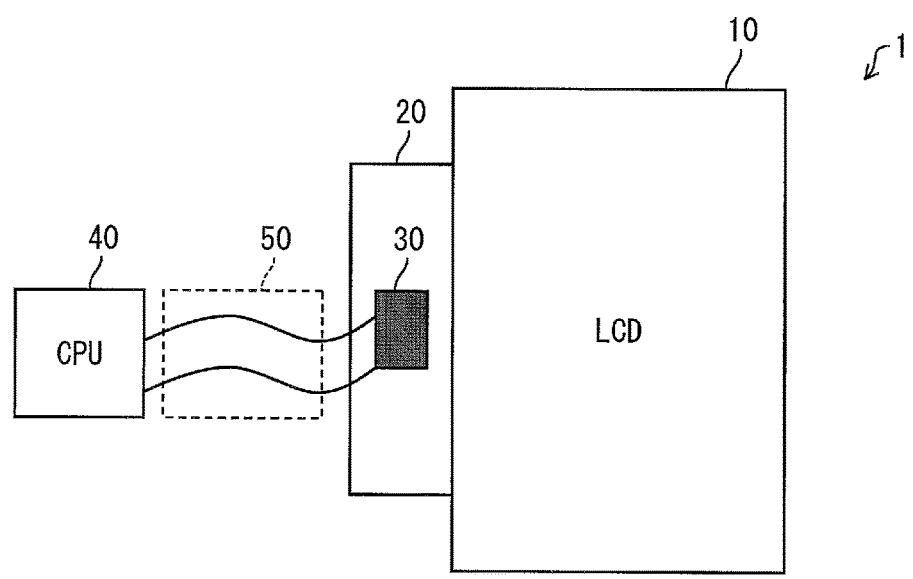

DISPLAY DEVICE AND CONTROL METHOD

TECHNICAL FIELD

The present invention relates to (i) a display device for display an image and (ii) a method of controlling the display device.

BACKGROUND ART

In general, a display system includes a display module and a display control device for controlling the display module. The display module includes pixels, which are arranged in a matrix, and a drive circuit for driving the pixels.

Such pixels are used for FPDs (Flat Panel Display) such as LCDs (Liquid Crystal Display), PDPs (Plasma Display Panel), EL (Electroluminescence) displays, and FEDs (Field Emission Display). Since FPDs can be made thinner and lighter than conventional CRTs (Cathode Ray Tube), the FPDs are used for the majority of display devices in recent years.

On the other hand, the display control device transmits, to the drive circuit of the display module, (i) an image signal and (ii) various control signals for driving the pixels. This causes the drive circuit to carry out a scan process in which the image signal is converted to an image. Then, the display module displays the image based on the image signal.

Recently, along with an increase in the resolution of display modules and with the application of the display modules to portable information devices, there are demands for a reduction in electric power consumption of the display modules. Under such circumstances, a technology disclosed in Patent Literature 1 is proposed.

A display device of Patent Literature 1 is configured such that (i) scanning periods and non-scanning periods are provided and (ii) a control IC receives prevents a gate driver and a source driver from receiving any signals except for gate start pulse signals during the non-scanning periods. This makes it unnecessary to operate logic circuits inside the gate driver and the source driver during the non-scanning periods, and therefore allows a reduction in electric power consumption. Patent Literature 1 further discloses configuring the display device such that it is possible to set a plurality of pausing periods (during which a scan process is paused) according to each type of scanning periods (during which the scan process is carried out).

In addition, as a technology for reducing electric power consumption, there is a known technology in which, in a case where an image displayed on a display module remains unchanged, communication between a display control device and the display module is temporarily suspended. Specifically, the display control device is temporarily suspended from supplying an image signal to the display module. Note that in such a case, a display module typically retains an image, which is displayed on a display, by refreshing the image with the use of an image signal stored in a frame memory which is included in the display module.

CITATION LIST

Patent Literature

Patent Literature 1
Japanese Patent Application Publication, Tokukai, No. 2001-312253 (Publication Date: Nov. 9, 2001)

SUMMARY OF INVENTION

Technical Problem

However, in a case where communication between the display control device and the display module is temporarily suspended, the display module is required to include a frame memory. This contributes to an increase in the cost of the display device.

In addition, according to the technology of Patent Literature 1, pausing periods, which are non-scanning periods during which an image is not refreshed, are set by the display control device. This requires the display control device of Patent Literature 1 to be configured such that timings with which to carry out and pause the scan process are set according to each type of display module. Therefore, an increase in the number of timings set for the scan process results in a large-scale and complex configuration of a circuit which generates the timings. Ultimately, an increase in cost will follow.

Furthermore, a period, during which display quality can be maintained without refreshing an image, varies depending on types of a display and/or types of a TFT process. Therefore, in a case where timings with which to refresh an image are controlled at a display control device end as with the technology of Patent Literature 1, components (e.g. TFTs included in display elements of a display, LCD materials, and the like) included in the display may deteriorate depending on the length of a pausing period during which the image is not refreshed.

The present invention has been made in view of the problem, and it is an object of the present invention to provide a display device capable of reducing electric power consumption and reducing cost while preventing the characteristics of components of a display from deteriorating.

Solution to Problem

In order to attain the object, a display device in accordance with an embodiment of the present invention includes: displaying means for causing an image based on an image signal to be displayed on a display; and image signal supplying means for supplying the image signal to the displaying means, the displaying means being configured to supply, to the image signal supplying means, a control signal that instructs the image signal supplying means to supply an image signal, and the image signal supplying means being configured to supply an image signal in a case where the image signal supplying means receives a control signal.

In order to attain the object, a method in accordance with an embodiment of the present invention is a method of controlling a display device, said display device including: displaying means for causing an image based on an image signal to be displayed on a display; and image signal supplying means for supplying the image signal to the displaying means, said method including the steps of: causing the displaying means to supply, to the image signal supplying means, a control signal that instructs the image signal supplying means to supply an image signal; and causing the image signal supplying means to supply an image signal in a case where the image signal supplying means receives a control signal.

Advantageous Effects of Invention

With a displayed device thus configured, it is possible to reduce electric power consumption and reduce cost while preventing characteristics of components of a display from deteriorating.

BRIEF DESCRIPTION OF DRAWINGS

FIG. 1 is a block diagram schematically illustrating a configuration of a display device in accordance with an embodiment of the present invention.

DESCRIPTION OF EMBODIMENTS

<Embodiment 1>

Figure 2:
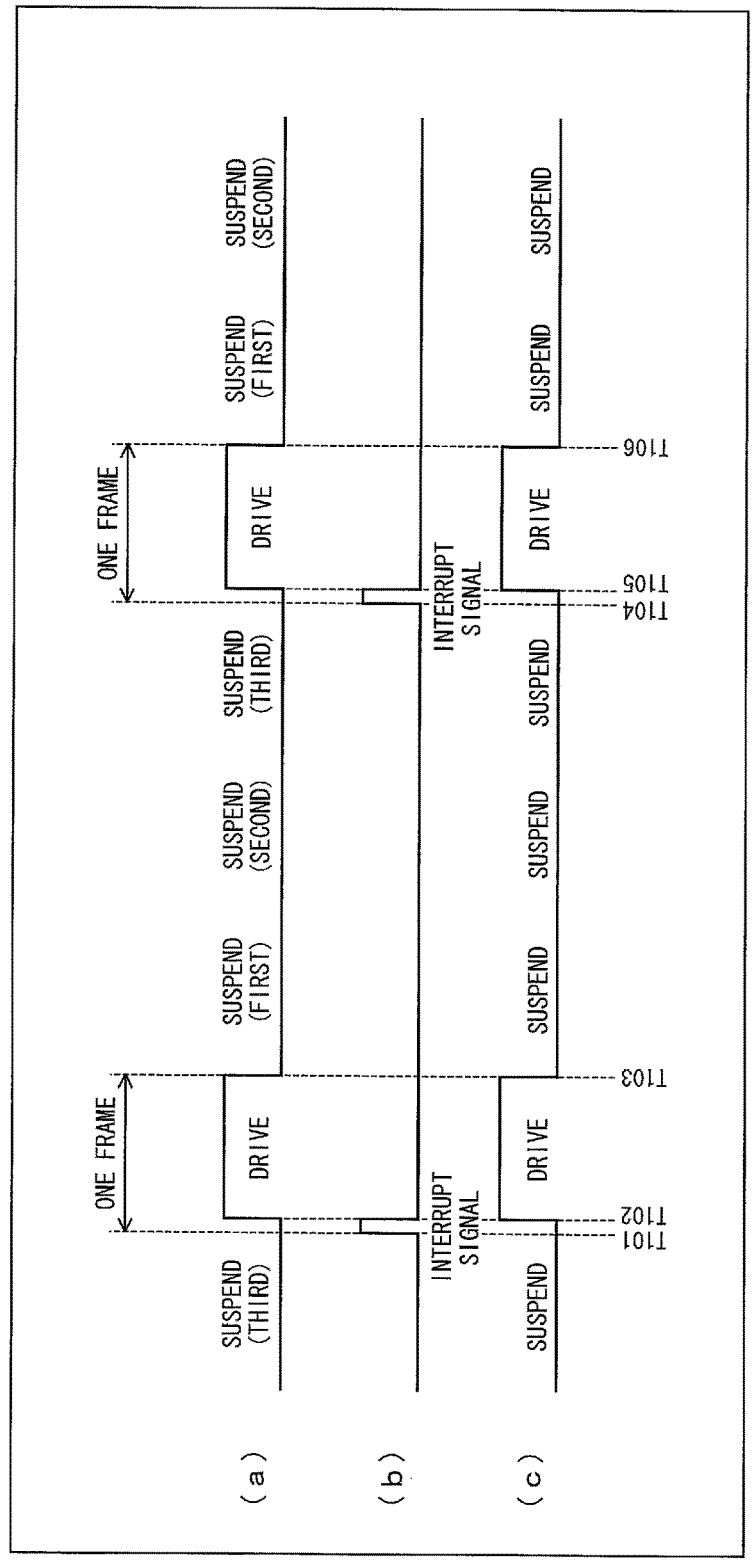
FIG. 2 is a timing chart showing how the display device in accordance with the embodiment carries out pause driving.
Figure 3:
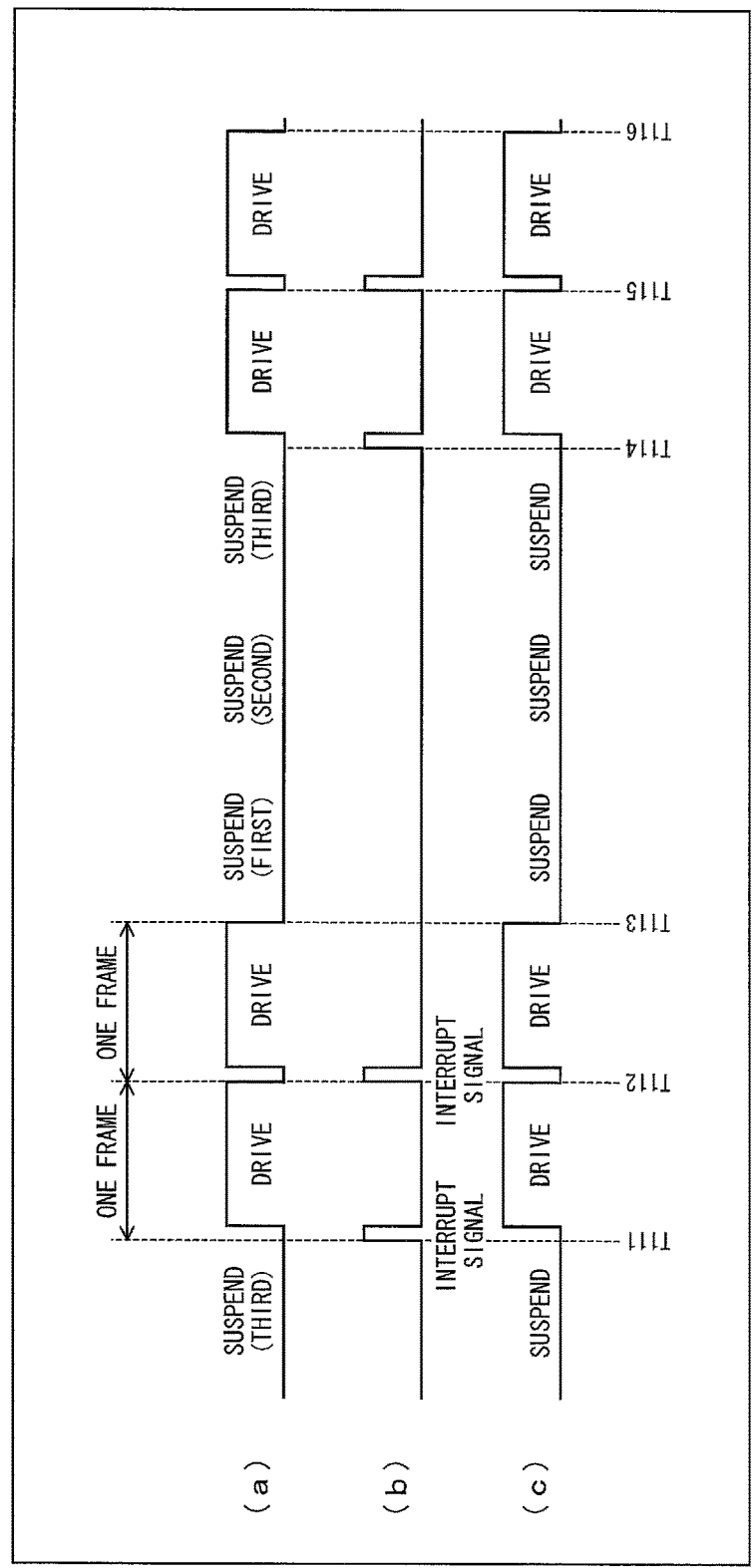
FIG. 3 is a timing chart showing timings with which a display device in accordance with a modification of the embodiment carries out pause driving.

The following description will discuss an embodiment of a display device of the present invention with reference to FIGS. 1 through 3. Note, however, configurations described in the embodiment are not to limit the present invention thereto unless thus specified, and are illustrative only.

[Configuration of Display Device]

A configuration of a display device in accordance with Embodiment 1 will be described first with reference to FIG. 1. FIG. 1 is a block diagram schematically illustrating the configuration of a display device 1. Examples of the display device 1 encompass mobile phones, smartphones, laptop personal computers, and various information-terminal devices of a tablet type.

As shown in FIG. 1, the display device 1 of Embodiment 1 includes an LCD (display) 10, an LCD driving section (displaying means) 20, an LCD controller (displaying means) 30, a CPU (image signal supplying means) 40, and an interface 50.

(LCD)

The LCD 10 includes pixels (not illustrated) which are arranged in a matrix. The LCD 10 further includes, although not illustrated, (i) scan signal lines for line-sequentially selecting and scanning the pixels and (ii) data signal lines for supplying image signals to pixels included in each selected line. Note that the scan signal lines and the data signal lines are provided so as to intersect each other via an insulating layer (not illustrated). The LCD 10 further includes a common electrode (not illustrated) for the pixels.

(LCD Driving Section)

The LCD driving section 20 includes a scan signal line drive circuit, a data signal line drive circuit, and a common electrode drive circuit (none of which is illustrated).

The scan signal line drive circuit line-sequentially scans the scan signal lines included in the LCD 10. In so doing, the scan signal line drive circuit supplies, to each of the scan signal lines, a square wave (scan signal) for turning on switching elements (TFTs) which are connected to pixel electrodes included in the pixels. This causes a line of pixels in the LCD 10 to be selected.

Note, however, that scanning by the scan signal line drive circuit is not limited to such line-sequential scanning. For example, it is possible to carry out interlaced scanning (so-called interlaced driving) in which (i) odd-numbered scan signal lines, such as a first one, a third one, a fifth one . . . , are first scanned and then (ii) even-numbered scan signal lines, such as a second one, a fourth one, a sixth one . . . , are scanned.

The data signal line drive circuit (i) converts an image signal, which has been received from an external source via the LCD controller 30, into a signal having a voltage to be applied to each of (a line of) pixels corresponding to a scan signal line selected by the scan signal line drive circuit and (ii) supplies a data signal having such a voltage to each of the data signal lines. This causes an image signal to be supplied to each of the pixels corresponding to the selected scan signal line.

In accordance with a polarity inversion signal received via the LCD controller 30, the common electrode drive circuit applies, to the common electrode included in the LCD, a predetermined common voltage for driving the common electrode.

With the configuration thus described, the LCD driving section 20 causes the LCD 10 to display an image based on an image signal supplied via the LCD controller 30. In addition, the LCD driving section 20 refreshes the image, that is, causes the LCD 10 to display, instead of the image being displayed, another image based on a new image signal additionally supplied.

Note that according to the Embodiment 1, the LCD driving section 20 and the LCD controller 30 together constitute displaying means.

(LCD Controller)

The LCD controller 30 receives an image signal from an external source and then supplies the image signal to the data signal line drive circuit included in the LCD driving section 20.

The LCD controller 30 controls timings of operations carried out by the scan signal line drive circuit and the data signal line drive circuit of the LCD driving section 20. Specifically, the LCD controller 30 controls (i) timings with which the scan signal line drive circuit supplies scan signals to the scan signal lines and (ii) timings with which the data signal line drive circuit supplies image signals to the data signal lines.

During pause driving in which electric power consumption is reduced by suspending the CPU 40 from supplying an image signal and by suspending the LCD driving section 20 from refreshing an image displayed on the LCD 10, the LCD controller 30 controls the LCD driving section 20 to refresh an image if necessary under conditions in which display quality of the image retained by the LCD 10 cannot be maintained otherwise.

Specifically, in order for the LCD driving section 20 to cause an image on the LCD 10 to be refreshed (such an operation is also referred to as "refreshing carried out by the LCD driving section 20"), the LCD controller 30 (i) supplies an interrupt signal (control signal) to the CPU 40 and (ii) controls the LCD driving section 20 to carry out the refresh in accordance with an image signal supplied from the CPU 40 in accordance with the interrupt signal. The interrupt signal is a signal that instructs the CPU 40 to supply an image signal for use in the refreshing carried out by the LCD driving section 20.

A timing with which the interrupt signal is supplied from the LCD controller 30 only needs to be set in advance according to characteristics of the LCD 10. Examples of the characteristics of the LCD 10 encompass an extent to which voltage that is retained for displaying an image on the pixels of the LCD 10 deteriorates over time.

Specifically, as periods determining timings with which to supply interrupt signals, it is only necessary to set the following pausing periods (suspending periods) in advance in the LCD controller 30: pausing periods whose lengths are each determined by a period between (i) a point in time where a given interrupt signal is supplied and (ii) a point in time where a following interrupt signal is supplied. That is, it is only necessary to set pausing periods, during each of which (I) the LCD driving section 20 is temporarily suspended from refreshing an image and (II) the CPU 40 is suspended from supplying an image signal. In addition, during pause driving, it is only necessary for an interrupt signal to be supplied each time such a pausing period passes. In other words, it is only necessary to set, in advance, pausing periods that determine the number of times (i.e. during how many frames) normal refreshing is to be suspended in relation to the number of times (i.e. during how many frames) the refreshing is carried out.

The LCD controller 30 can supply, during each frame after a pausing period has passed, an interrupt signal in synchronization with a timing with which the LCD driving section 20 starts supplying data signals to the data signal lines. As an alternative, the LCD controller 30 can supply an interrupt signal in synchronization with a timing with which the CPU 40 supplies an image signal to the LCD controller 30 (described later).

As an alternative, the LCD controller 30 can supply an interrupt signal in synchronization with (i) a timing with which the LCD driving section 20 starts supplying data signals to the data signal lines during each frame and (ii) a timing with which the CPU 40 supplies an image signal to the LCD controller 30.

Embodiment 1 discusses an example in which pausing periods are set in the LCD controller 30 in advance such that, during pause driving, refreshing is suspended for as long as three frames after the refreshing is carried out once (for as long as one frame).

Note that voltage-retention characteristics of the pixels of the LCD 10 are closely correlated with characteristics of TFTs included in the respective pixels. Therefore, a greater correlation between such characteristics makes it possible to set longer pausing periods in advance.

(CPU)

The CPU (Central Processing Unit) 40 controls each of the components included in the display device 1. In addition, the CPU 40 supplies, to the LCD controller 30, an image signal supplied from an external source.

During pause driving, the CPU 40 supplies an image signal only in a case where the CPU 40 receives an interrupt signal from the LCD controller 30.

(Interface)

The interface 50 serves as information transmitting means via which the CPU 40 supplies the image signal to the LCD controller 30.

Note that FIG. 1 shows two transmission lines of the interface 50 for clearly indicating that (i) the CPU 40 supplies an image signal to the LCD controller 30 and (ii) the LCD controller 30 supplies an interrupt signal to the CPU 40. Needless to say, the interface 50 can include a single transmission line or a plurality of transmission lines.

[Pause Driving]

Pause driving of the display device 1 in accordance with Embodiment 1 will be described next with reference to FIG. 2. FIG. 2 is a timing chart showing timings with which the display device 1 carries out pause driving. (a) of FIG. 2 shows timings with which the CPU 40 supplies an image signal to the LCD controller 30 via the interface 50. (b) of FIG. 2 shows timings with which the LCD controller 30 supplies an interrupt signal to the CPU 40 via the interface 50. (c) of FIG. 2 shows timings with which the LCD driving section 20 causes an image displayed on the LCD 10 to be refreshed.

Embodiment 1 discusses an example in which a pausing period during the pause driving is as long as a period required for carrying out the refreshing three times (three frames).

As shown in (b) of FIG. 2, the LCD controller 30 supplies an interrupt signal to the CPU 40 at time T101.

In a case where the CPU 40 receives the interrupt signal, the CPU 40 supplies an image signal to the LCD controller 30 via the interface 50 during a period between time T102 and time T103 as shown in (a) of FIG. 2. The LCD controller 30 supplies, to the LCD driving section 20, the image signal received from the CPU 40.

In a case where the LCD driving section 20 receives the image signal from the LCD controller 30, the LCD driving section 20 refreshes an image on the LCD 10 during the period between the time T102 and the time T103 (see (c) of FIG. 2) so that an image based on the image signal thus received is displayed on the LCD 10. Note that as shown in FIG. 2, a period between the time T101 and the time T103 constitute one frame.

In a case where refreshing of the image on the LCD 10 ends at the time T103, the LCD controller 30 causes the LCD driving section 20 to suspend the refreshing until time T104 at which the pausing period has passed. The LCD 10 retains, until a next timing with which to carry out the refreshing, the image displayed during the period between the time T102 and the time T103.

In a case where the pausing period ends at the time T104, the LCD controller 30 re-supplies an interrupt signal to the CPU 40 as shown in (b) of FIG. 2.

In a case where the CPU 40 receives the interrupt signal, the CPU 40 supplies an image signal to the LCD controller 30 via the interface 50 during a period between time T105 and time T106 as shown in (a) of FIG. 2. The LCD controller 30 supplies, to the LCD driving section 20, the image signal thus received from the CPU 40.

In a case where the LCD driving section 20 receives the image signal from the LCD controller 30, the LCD driving section 20 refreshes the image on the LCD 10 during the period between the time T105 and the time T106 (see (c) of FIG. 2) so that an image based on the image signal thus received is displayed on the LCD 10.

In a case where the refreshing of the image carried out by the LCD driving section 20 ends at the time T106, the LCD controller 30 causes the LCD driving section 20 to suspend the refreshing until another pausing period passes.

With the display device 1 of Embodiment 1 thus configured, it is possible to directly receive an image signal (for use in the refreshing) from the CPU 40 by causing the LCD controller 30 to supply an interrupt signal to the CPU 40. Therefore, according to the display device 1, it is unnecessary for the LCD driving section 20 to carry out the refreshing in accordance with an image signal stored in a frame memory of the LCD controller 30. In other words, it is unnecessary for the LCD controller 30 to include a frame memory.

Hence, with the display device 1 of Embodiment 1, it is possible to reduce a cost required for a frame memory.

With the display device 1 of Embodiment 1, it is also possible to set pausing periods in accordance with the characteristics of the LCD 10 in advance. This makes it possible to prevent the characteristics of the components (e.g. TFTs, LCD materials for the LCD, and the like) of the pixels in the LCD 10 from being subject to deterioration caused by the incompatibility between the length of pausing periods and the characteristics of the LCD 10. An example of the incompatibility is an excessively long pausing period.

With the display device 1 of Embodiment 1, it is possible to set, in the LCD controller 30, pausing periods in accordance with the characteristics of the LCD 10. This makes it unnecessary to individually design different CPUs 40 for respective LCDs differing in characteristic. This allows a reduction in cost required for designing the CPU 40.

Note that although Embodiment 1 discusses an example in which pausing periods are set in the LCD controller 30 in advance. However, the present invention is not limited to such an example. For instance, it is possible to employ a configuration in which, each time pause driving is carried out, the LCD controller 30 sets pausing periods in accordance with the characteristics of the LCD 10.

<Modification>

Embodiment 1 discussed the example in which pause driving is carried out such that a pausing period is provided each time refreshing is carried out for a single frame. However, the present invention is not limited to such an example. For instance, it is possible that, during pause driving, a pausing period is provided each time refreshing is carried out for a predetermined number of frames. The present modification will discuss an example in which pause driving is carried out such that a pausing period is provided each time refreshing is carried out for two consecutive frames.

The pause driving in accordance with the present modification will be described with reference to FIG. 3. FIG. 3 is a timing chart showing timings with which a display device 1 in accordance with the present modification carries out the pause driving. (a) of FIG. 3 shows timings with which a CPU 40 supplies an image signal to an LCD controller 30. (b) of FIG. 3 shows timings with which the LCD controller 30 supplies an interrupt signal to the CPU 40. (c) of FIG. 3 shows timings with which an LCD driving section 20 refreshes an image displayed on an LCD 10.

As shown in (a) through (c) of FIG. 3, the LCD controller 30 supplies interrupt signals to the CPU 40 at time T111 and time T112. This causes the LCD driving section 20 to carry out the refreshing during a period between the time T111 and the time T113 over two consecutive frames.

The LCD controller 30 causes the LCD driving section 20 to suspend the refreshing during a period between (i) time T113 at which the LCD driving section 20 carried out the refreshing twice and (ii) time T114 at which a pausing period has passed.

In a case where the pausing period ends at the time T114, the LCD controller 30 re-supplies interrupt signals to the CPU 40 at time T114 and time T115. In accordance with the interrupt signals thus supplied, the CPU 40 supplies image signals to the LCD driving section 20. This causes the LCD driving section 20 to carry out refreshing during a period between the time T114 and time T116.

When the refreshing carried out by the LCD driving section 20 ends at the time T116, the LCD controller 30 causes the LCD driving section 20 to suspend the refreshing until another pausing period passes.

<Embodiment 2>

Embodiment 1 discussed the example in which the LCD controller 30 supplies an interrupt signal to the CPU 40 at the end of a pausing period so that the LCD driving section 20 carries out refreshing of an image. Alternatively, it is possible that the CPU 40 supplies an image signal to the LCD controller 30 during a pausing period.

Figure 4:
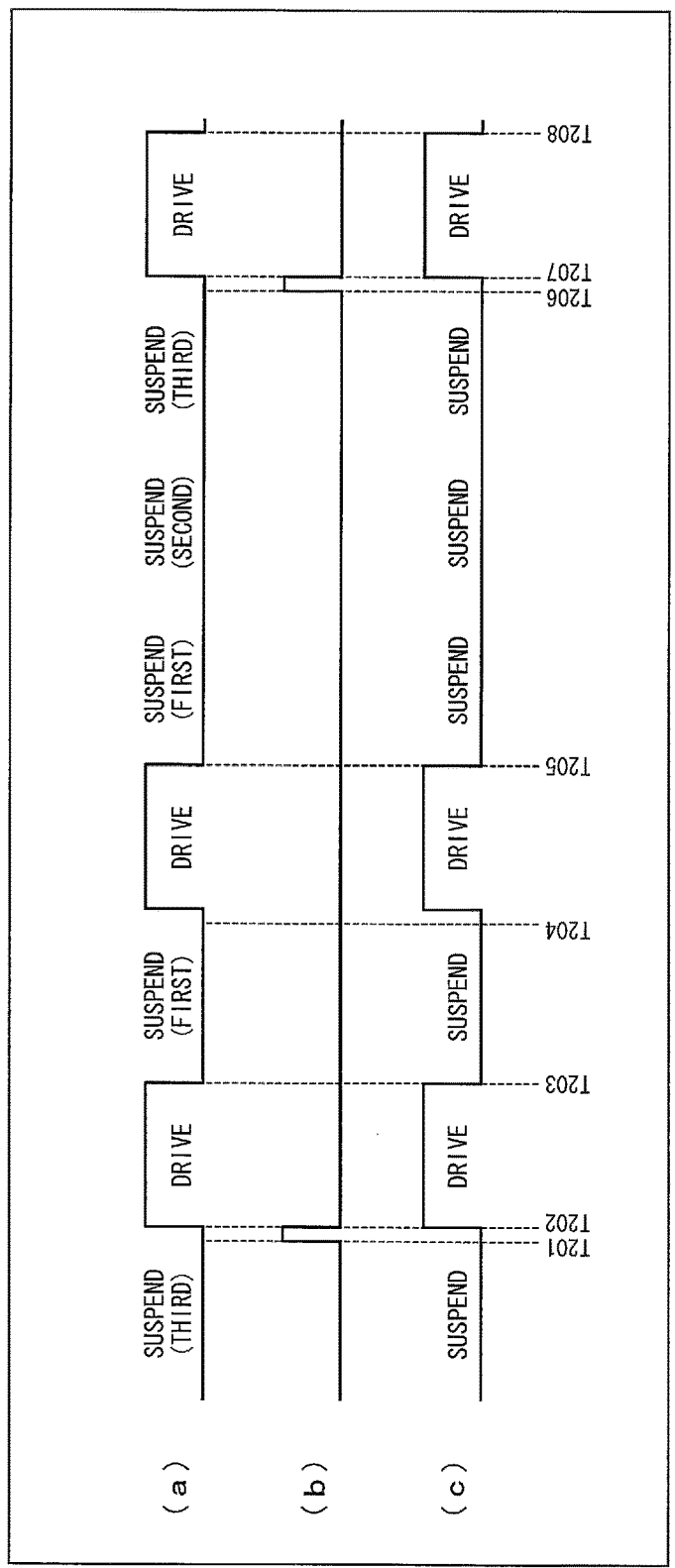
FIG. 4 is a timing chart showing how a display device in accordance with another embodiment of the present invention carries out pause driving.

Embodiment 2 will discuss, with reference to FIG. 4, an operation of the display device 1 in such a case. FIG. 4 is a timing chart showing timings with which the display device 1 of Embodiment 2 carries out pause driving. (a) of FIG. 4 shows timings with which a CPU 40 supplies an image signal to an LCD controller 30. (b) of FIG. 4 shows timings with which the LCD controller 30 supplies an interrupt signal to the CPU 40. (c) of FIG. 4 shows timings with which an LCD driving section 20 refreshes an image displayed on an LCD 10.

As shown in (b) of FIG. 4, the LCD controller 30 supplies an interrupt signal to the CPU 40 at time T201.

In a case where the CPU 40 receives the interrupt signal, the CPU 40 supplies an image signal to the LCD controller 30 via an interface 50 during a period of time between time T202 and time T203 as shown in (a) of FIG. 4. The LCD controller 30 supplies, to the LCD driving section 20, the image signal thus received from the CPU 40.

In a case where the LCD driving section 20 receives the image signal from the LCD controller 30, the LCD driving section 20 refreshes an image displayed on the LCD 10 during the period between the time T202 and the time T203 (see (c) of FIG. 4) so that an image based on the image signal thus received is displayed on the LCD 10.

In a case where the refreshing of the image on the LCD 10 ends at the time T203, the LCD controller 30 causes the LCD driving section 20 to suspend the refreshing until another pausing period passes.

In operating as such, there may be frames, such as a frame starting at time T204, during which the CPU 40 supplies an image signal even in a pausing period (see (a) of FIG. 4). In such a case, the LCD controller 30 (i) supplies, to the LCD driving section 20, an image signal thus supplied and (ii) causes the LCD driving section 20 to carry out refreshing (see (c) of FIG. 4).

In a case where the refreshing carried out by the LCD driving section 20 ends at time T205, the LCD controller 30 causes the LCD driving section 20 to suspend refreshing until another pausing period passes.

In a case where the pausing period ends at time T206, the LCD controller 30 re-supplies an interrupt signal to the CPU 40 at the time T206 as shown in (b) of FIG. 4. In accordance with the interrupt signal, the CPU 40 supplies an image signal to the LCD driving section 20. This causes the LCD driving section 20 to carry out refreshing during a period between the time T206 and time T208.

In a case where the refreshing carried out by the LCD driving section 20 ends at the time T208, the LCD controller causes the LCD driving section 20 to suspend the refreshing until another pausing period passes.

With the display device 1 of Embodiment 2 thus configured, it is possible to cause the LCD driving section 20 to refresh an image in accordance with an image signal even in a case where the image signal is supplied from the CPU 40 during a pausing period.

Note that although Embodiment 2 discussed the example in which the CPU 40 supplies an image signal one frame after a pause driving is started (at the time T204 in FIG. 4), the present invention is not limited to such an example. The LCD controller 30 can cause the LCD driving section 20 to carry out refreshing even in a case where, for example, an image signal is supplied from the CPU 40 (i) a plurality of frames after a pausing period is started and/or (ii) at some point during a frame or the like.

Specifically, in a case where an image signal is supplied from the CPU 40 even though an interrupt signal is not supplied, the LCD controller 30 may cause the LCD driving section 20 to carry out refreshing, regardless of what timing during a pausing period the image signal is supplied with.

<Modification>

Embodiment 2 discussed the example in which (i) refreshing is carried out in accordance with an image signal supplied from the CPU 40 during a pausing period and (ii) immediately after the refreshing is carried out, another pausing period is started. However, the present invention is not limited to such an example. For instance, it is possible to carry out refreshing in accordance with an image signal supplied from the CPU 40 during a pausing period and then (ii) refreshing is continued for a predetermined number of frames. The present modification will discuss an example in which (i) refreshing is carried out in accordance with an image signal supplied from a CPU 40 during a pausing period and then (ii) refreshing is continued for two consecutive frames.

Figure 5:
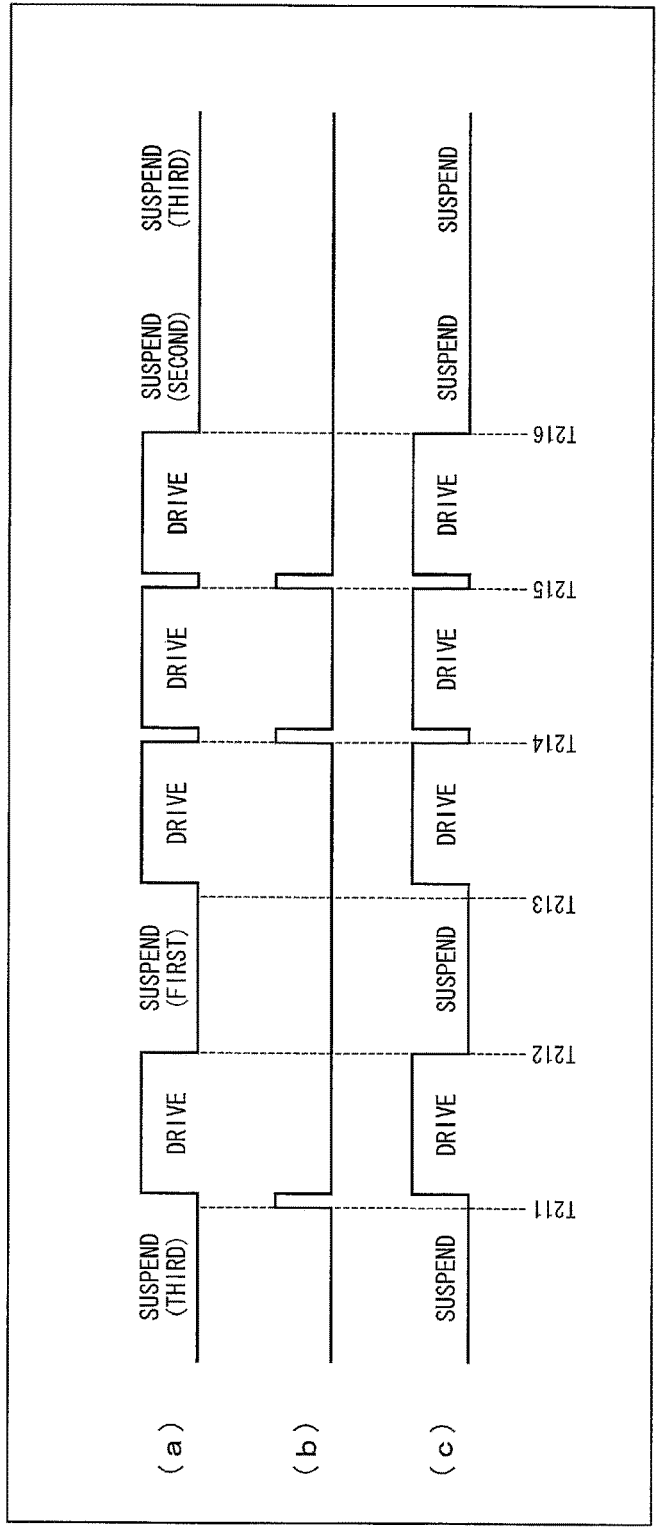
FIG. 5 is a timing chart showing timings with which a display device in accordance with a modification of said another embodiment carries out pause driving.

Pause driving in accordance with the present modification will be described with reference to FIG. 5. FIG. 5 is a timing chart showing timings with which a display device 1 in accordance with the modification of Embodiment 2 carries out pause driving. (a) of FIG. 5 shows timings with which the CPU 40 supplies an image signal to an LCD controller 30. (b) of FIG. 5 shows timings with which the LCD controller 30 supplies an interrupt signal to the CPU 40. (c) of FIG. 5 shows timings with which an LCD driving section 20 refreshes an image displayed on an LCD 10.

As shown in (a) through (c) of FIG. 5, the LCD controller 30 supplies an interrupt signal to the CPU 40 at time T211. This causes the LCD driving section 20 to carry out refreshing during a period between the time T211 and time T212.

The LCD controller 30 causes the LCD driving section 20 to suspend the refreshing during a period between (i) the time T212 at which the LCD driving section 20 ends the refreshing and (ii) a point in time at which a following pausing period has passed.

In operating as such, there may be frames, such as a frame starting at time T213, during which the CPU 40 supplies an image signal even in a pausing period (see (a) of FIG. 5). In such a case, the LCD controller 30 (i) supplies, to the LCD driving section 20, an image signal thus supplied and (ii) causes the LCD driving section 20 to carry out refreshing (see (c) of FIG. 5).

In a case where the LCD driving section 20 ends the refreshing at time T214, the LCD controller 30 supplies interrupt signal to the CPU 40 at the time T214 and time T215. In accordance with the interrupt signal, the CPU 40 supplies an image signal to the LCD driving section 20 so as to cause refreshing to be carried out during a period from the time T214 to time T216.

In other words, the refreshing is carried out during a period between (i) the time T213 at which the image signal is supplied from the CPU 40 during a pausing period and (ii) the time T216.

Note that in a case where the LCD driving section 20 ends the refreshing at the time T216, the LCD controller 30 causes the LCD driving section 20 to suspend the refreshing until another pausing period passes.

<Embodiment 3>

Embodiment 1 discussed the example in which the LCD controller 30 supplies an interrupt signal to the CPU 40 at the end of a pausing period so that the LCD driving section 20 carries out refreshing of an image. However, there may be cases where the CPU 40 fails to supply an image signal (due to malfunctioning of the CPU 40, for example) although an interrupt signal has been supplied to the CPU 40.

Figure 6:
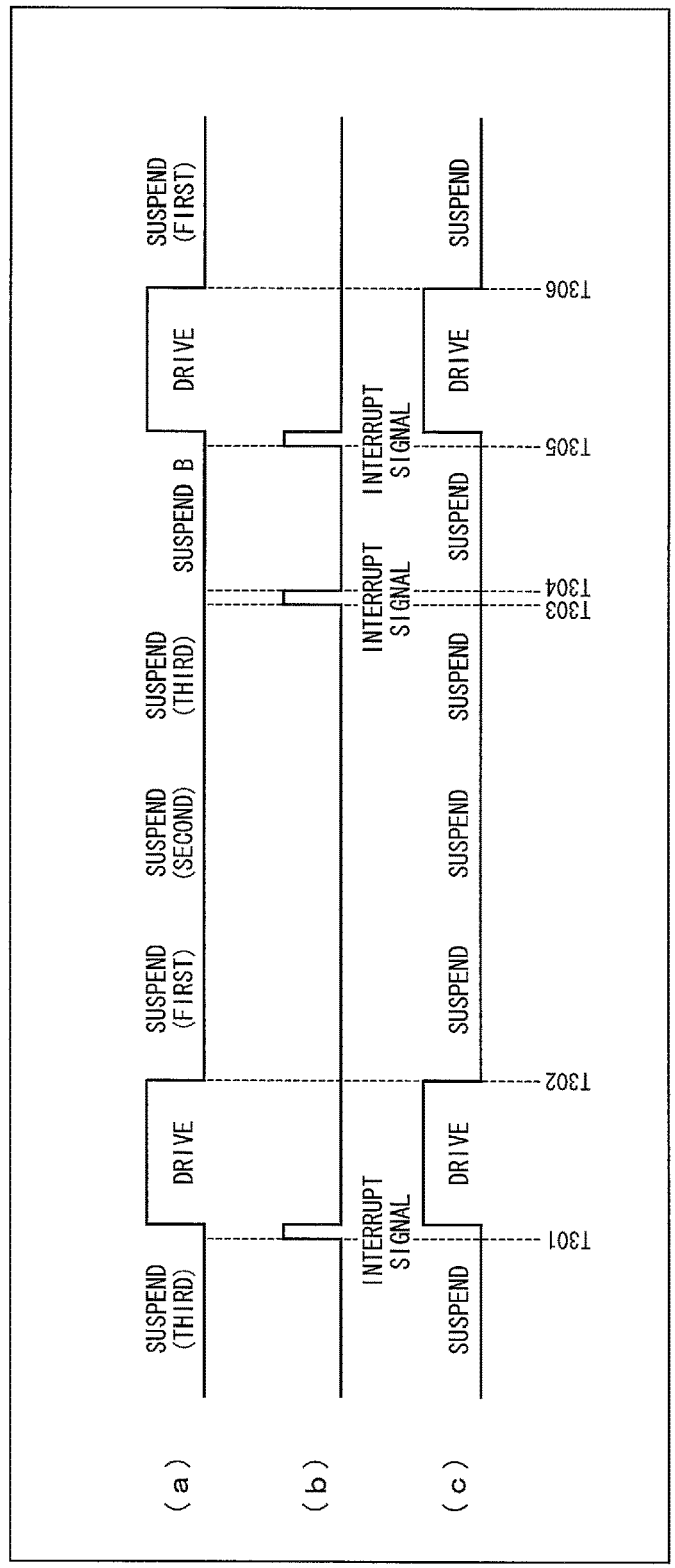
FIG. 6 is a timing chart showing how a display device in accordance with a further embodiment of the present invention carries out pause driving.

Embodiment 3 will discuss, with reference to FIG. 6, an operation of the display device 1 in such a case. FIG. 6 is a timing chart showing timings with which an display device 1 in accordance with Embodiment 3 carries out pause driving. (a) of FIG. 6 shows timings with which a CPU 40 supplies an image signal to an LCD controller 30. (b) of FIG. 6 shows timings with which the LCD controller 30 supplies an interrupt signal to the CPU 40. (c) of FIG. 6 shows timings with which an LCD driving section 20 refreshes an image displayed on an LCD 10.

As shown in (a) through (c) of FIG. 6, the LCD controller 30 supplies an interrupt signal to the CPU 40 at time T301. This causes the LCD driving section 20 to carry out refreshing during a period between the time T301 and time T302.

The LCD controller 30 causes the LCD driving section 20 to suspend the refreshing during a period between (i) the time T302 at which the LCD driving section 20 ends the refreshing and (ii) a point in time at which a following pausing period has passed.

In a case where the following pausing period ends at time T303, the LCD controller 30 re-supplies an interrupt signal to the CPU 40 at the time T303. In so doing, despite the interrupt signal supplied to the CPU 40, the CPU 40 does not supply an image signal, and therefore the LCD driving section 20 does not carry out refreshing.

In such a case, the LCD controller 30 re-supplies an interrupt signal to the CPU 40 at time T305. This causes the CPU 40 to supply an image signal to the LCD driving section 20 in accordance with the interrupt signal, and therefore causes the LCD driving section 20 to carry out refreshing during a period between the time T305 and time T306.

In a case where the LCD driving section 20 ends the refreshing at the time T306, the LCD controller 30 causes the LCD driving section 20 to suspend the refreshing until another pausing period passes.

According to the display device 1 thus configured, the following is true: Even in a case where an image signal is not supplied after an interrupt signal is supplied to the CPU 40 only once, it is still possible to obtain an image signal from the CPU 40 by further supplying an interrupt signal to the CPU 40. This allows the LCD controller 30 to cause the LCD driving section 20 to carry out refreshing.

<Modification 1>

Embodiment 3 discussed the example in which, in a case where an image signal is not supplied from the CPU 40 even if an interrupt signal has been supplied to the CPU 40, an interrupt signal is supplied to the CPU 40 one more time so that an image signal is supplied from the CPU 40 and therefore refreshing is carried out. However, the present invention is not limited to such an example. For instance, it is possible to continuously supply an interrupt signal with each frame until the CPU 40 supplies an image signal. Modification 1 will discuss an example in which, in a case where an image signal is not supplied from the CPU 40 even if an interrupt signal has been supplied to the CPU 40, an interrupt signal is supplied to the CPU 40 two additional times.

Figure 7:
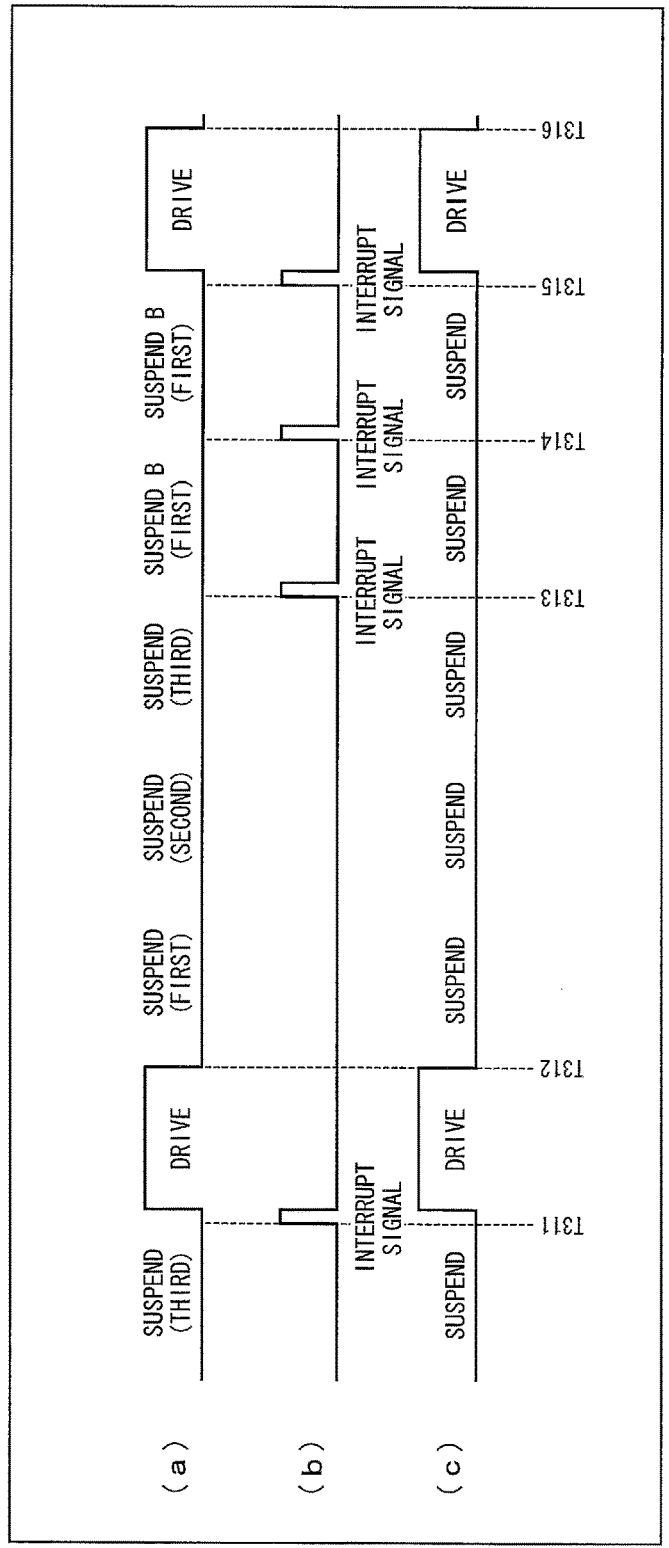
FIG. 7 is a timing chart showing timings with which a display device in accordance with Modification 1 of said further embodiment carries out pause driving.

Pause driving of a display device 1 in accordance with Modification 1 will be described below with reference to FIG. 7. FIG. 7 is a timing chart showing timings with which the display device 1 in accordance with Modification 1 of the Embodiment 3 carries out pause driving. (a) of FIG. 7 shows timings with which a CPU 40 supplies an image signal to an LCD controller 30. (b) of FIG. 7 shows timings with which the LCD controller 30 supplies an interrupt signal to the CPU 40. (c) of FIG. 7 shows timings with which an LCD driving section 20 refreshes an image displayed on an LCD 10.

As shown in (a) through (c) of FIG. 7, the LCD controller 30 supplies an interrupt signal to the CPU 40 at time T311. This causes the LCD driving section 20 to carry out refreshing during a period between the time T311 and time T312.

The LCD controller 30 causes the LCD driving section 20 to suspend the refreshing during a period between (i) the time T312 at which the LCD driving section 20 ends the refreshing and (ii) a point in time at which a following pausing period has passed.

In a case where the following pausing period ends at time T313, the LCD controller 30 re-supplies an interrupt signal to the CPU 40 at the time T313. In so doing, despite the interrupt signal supplied to the CPU 40, the CPU 40 does not supply an image signal, and therefore the LCD driving section 20 does not carry out refreshing.

In such a case, the LCD controller 30 supplies an interrupt signal with every frame until the CPU 40 supplies an image signal. According to Modification 1, as shown in (b) of FIG. 7, the LCD controller 30 supplies an interrupt signal to the CPU 40 with every frame, such as at time T313, time T314, and time T315.

In a case where the CPU 40 supplies an image signal in response to the interrupt signal supplied from the LCD controller 30 at the time T315, the LCD driving section 20 carries out refreshing during a period between the time T315 and time T316.

In a case where the LCD driving section 20 ends the refreshing at the time T316, the LCD controller 30 causes the LCD driving section 20 to suspend the refreshing until another pausing period passes.

<Modification 2>

Modification 1 of Embodiment 3 discussed the example in which, in a case where an image signal is not supplied from the CPU 40 even if an interrupt signal has been supplied to the CPU 40, the LCD controller 30 continuously supplies an interrupt signal with every frame until the CPU 40 supplies an image signal. However, the present invention is not limited to such an example. For instance, it is possible to supply, until the CPU 40 supplies an image signal, an interrupt signal each time a fixed period of time (e.g. a period of time required for a predetermined number of frames) passes. Modification 2 will discuss an example in which an LCD controller 30 continuously supplies an interrupt signal with every two frames (i.e. frames, in which an interrupt signal is supplied, and frames, in which an interrupt signal is not supplied, are continuously alternated with every frame) until the CPU 40 supplies an image signal.

Figure 8:
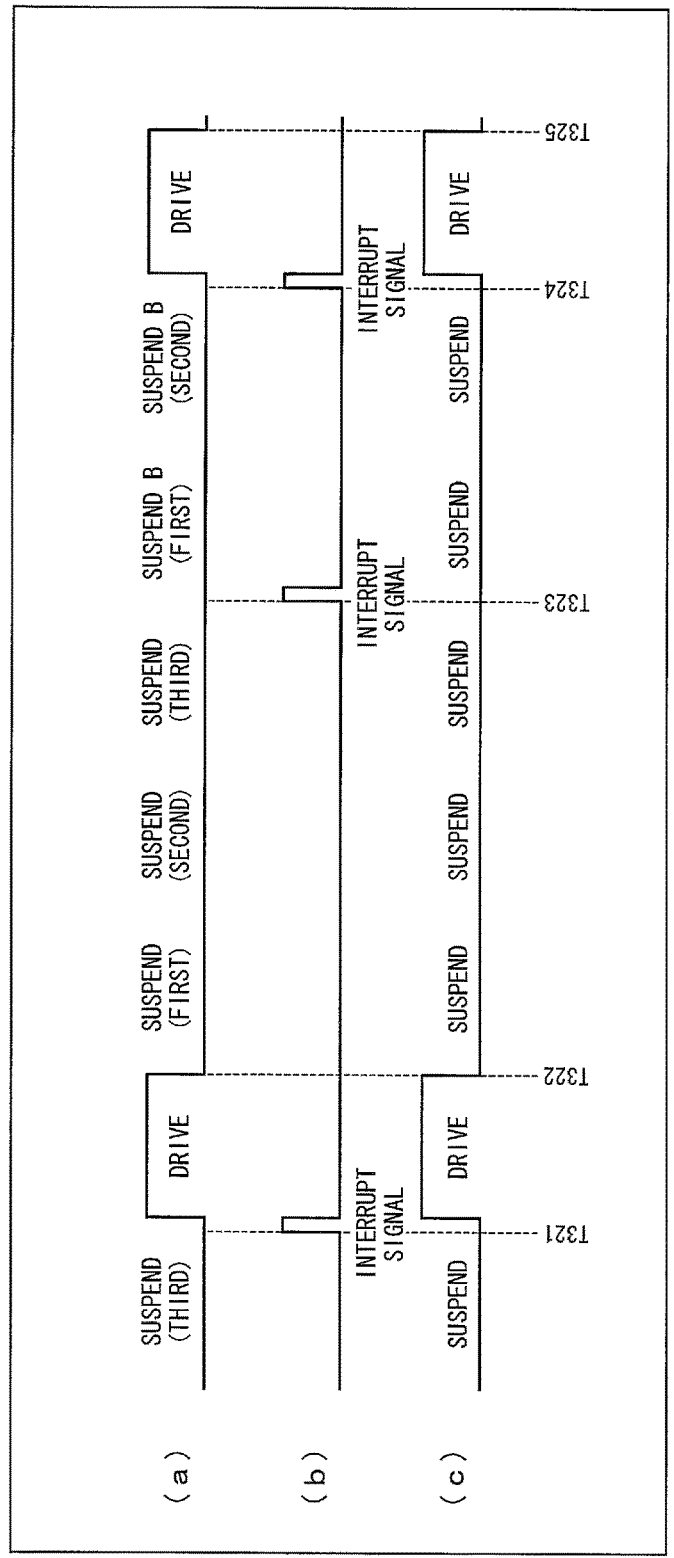
FIG. 8 is a timing chart showing timings with which a display device in accordance with Modification 2 of said further embodiment carries out pause driving.

Pause driving of a display device 1 in accordance with Modification 2 will be described below with reference to FIG. 8. FIG. 8 is a timing chart showing timings with which the display device 1 of Modification 2 of Embodiment 3 carries out pause driving. (a) of FIG. 8 shows timings with which a CPU 40 supplies an image signal to an LCD controller 30. (b) of FIG. 8 shows timings with which the LCD controller 30 supplies an interrupt signal to the CPU 40. (c) of FIG. 8 shows timings with which an LCD driving section 20 refreshes an image displayed on an LCD 10.

As shown in (a) through (c) of FIG. 8, the LCD controller 30 supplies an interrupt signal to the CPU 40 at time T321. This causes the LCD driving section 20 to carry out refreshing during a period between the time T321 and time T322.

The LCD controller 30 causes the LCD driving section 20 to suspend the refreshing during a period between (i) the time T322 at which the LCD driving section 20 ends the refreshing and (ii) a point in time at which a following pausing period has passed.

In a case where the following pausing period ends at time T323, the LCD controller 30 re-supplies an interrupt signal to the CPU 40 at the time T323. In so doing, despite the interrupt signal supplied to the CPU 40, the CPU 40 does not supply an image signal, and therefore the LCD driving section 20 does not carry out refreshing.

In such a case, the LCD controller 30 supplies an interrupt signal with every two frames until the CPU 40 supplies an image signal. According to Modification 2, as shown in (b) of FIG. 8, the LCD controller 30 supplies an interrupt signal at the time T323, and then re-supplies an interrupt signal at time T324 which is two frames after the time T323.

In a case where the CPU 40 supplies an image signal in response to the interrupt signal supplied from the LCD controller 30 at the time T324, the LCD driving section 20 carries out refreshing during a period between the time T324 and time T325.

In a case where the LCD driving section 20 ends the refreshing at the time T325, the LCD controller 30 causes the LCD driving section 20 to suspend the refreshing until another pausing period passes.

<Embodiment 4>

Embodiment 1 discussed the example in which the LCD controller 30 supplies an interrupt signal to the CPU 40 at the end of a pausing period so that the LCD driving section 20 carries out refreshing of an image. However, there may be cases where the CPU 40 fails to supply an image signal (due to malfunctioning of the CPU 40, for example) although an interrupt signal has been supplied to the CPU 40.

In such a case, a display device 1 of Embodiment 4 operates so as to cause each of the pixels included in an LCD 10 to display black color (so-called black image).

Figure 9:
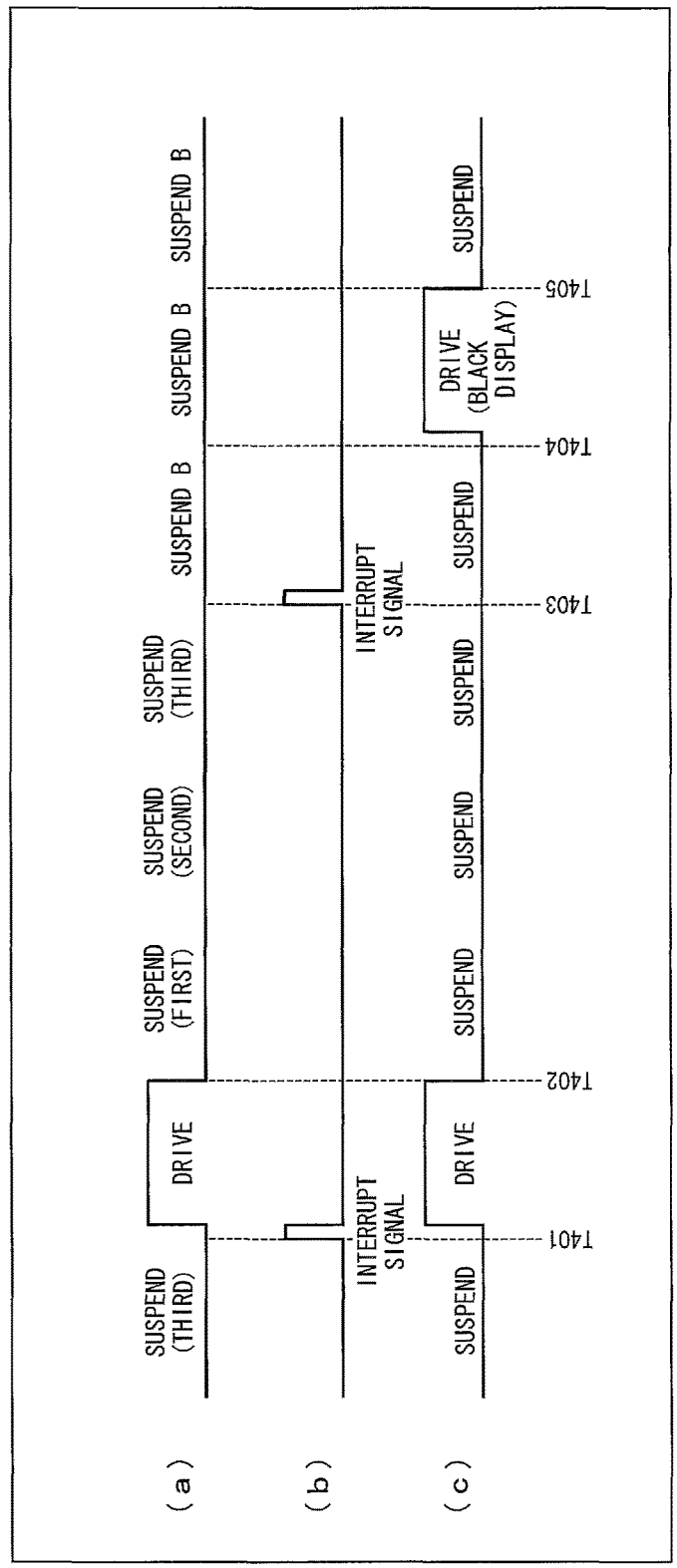
FIG. 9 is a timing chart showing how a display device in accordance with a further embodiment of the present invention carries out pause driving.

The following description will discuss, with reference to FIG. 9, an operation of the display device 1 in accordance with Embodiment 4. FIG. 9 is a timing chart showing timings with which the display device 1 carries out pause driving. (a) of FIG. 9 shows timings with which a CPU 40 supplies an image signal to an LCD controller 30. (b) of FIG. 9 shows timings with which the LCD controller 30 supplies an interrupt signal to the CPU 40. (c) of FIG. 9 shows timings with which an LCD driving section 20 refreshes an image displayed on an LCD 10.

As shown in (a) through (c) of FIG. 9, the LCD controller 30 supplies an interrupt signal to the CPU 40 at time T401. This causes the LCD driving section 20 to carry out refreshing during a period between the time T401 and time T402.

The LCD controller 30 causes the LCD driving section 20 to suspend the refreshing during a period between (i) the time T402 at which the LCD driving section 20 ends the refreshing and (ii) a point in time at which a following pausing period has passed.

In a case where the following pausing period ends at time T403, the LCD controller 30 re-supplies an interrupt signal to the CPU 40 at the time T403. In so doing, despite the interrupt signal supplied to the CPU 40, the CPU 40 does not supply an image signal, and therefore the LCD driving section 20 does not carry out refreshing.

In such a case, the LCD controller 30 controls the LCD driving section 20 so that a black image (indicated as "black display" in FIG. 9) is displayed on the LCD 10 during a second frame (starting at time T404) immediately after a first frame starting at the time T403.

In a case where the LCD driving section 20 ceases causing the LCD 10 to display the black image at time T405, the LCD controller 30 causes the LCD driving section 20 to suspend the refreshing until the CPU 40 supplies an image signal.

According to the display device 1 of Embodiment 4 thus configured, the LCD 10 displays a black image in a case where an image signal is not supplied from the CPU 40 even if an interrupt signal has been supplied to the CPU 40. This makes it possible to prevent the characteristics of the components (e.g. TFTs, LCD materials for the LCD, and the like) of the pixels in the LCD 10 from being subject to deterioration caused by an image on the LCD 10 not being refreshed.

<Modification 1>

Embodiment 4 discussed the example in which, in a case where an image signal is not supplied from the CPU 40 even if an interrupt signal has been supplied to the CPU 40, the display device 1 operates so as to cause the LCD 10 to display a black image during a second frame immediately after a first frame during which the interrupt signal was supplied. However, the present invention is not limited to such an example. For instance, it is possible to cause the LCD 10 to display a black image for a predetermined number of frames immediately after a frame during which an interrupt signal was supplied. Modification 1 will discuss an example in which the LCD 10 displays a black image for two frames immediately after a frame during which an interrupt signal was supplied.

Figure 10:
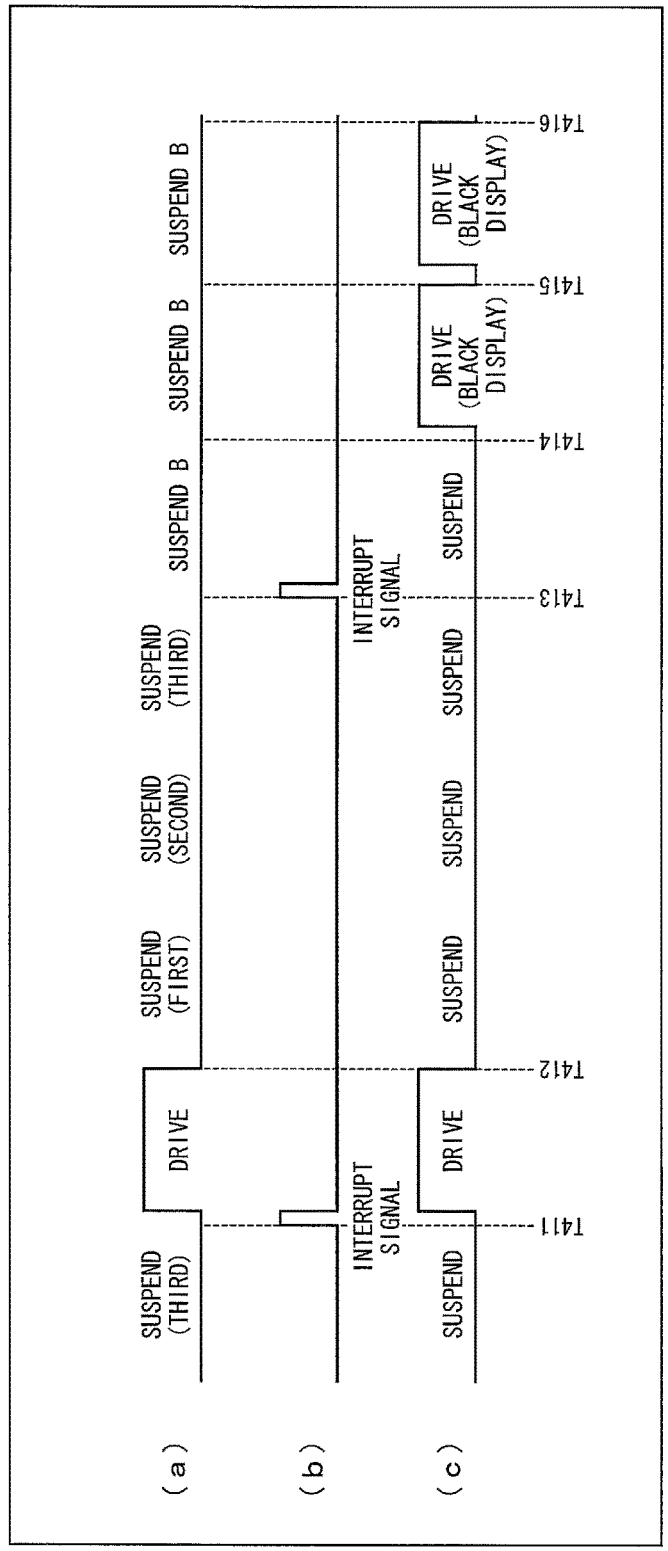
FIG. 10 is a timing chart showing timings with which a display device in accordance with Modification 1 of said further embodiment carries out pause driving.

Pause driving of a display device 1 of Modification 1 will be described below with reference to FIG. 10. FIG. 10 is a timing chart showing timings with which the display device 1 in accordance with Modification 1 of Embodiment 4 carries out the pause driving. (a) of FIG. 10 shows timings with which a CPU 40 supplies an image signal to an LCD controller 30. (b) of FIG. 10 shows timings with which the LCD controller 30 supplies an interrupt signal to the CPU 40. (c) of FIG. 10 shows timings with which an LCD driving section 20 refreshes an image displayed on an LCD 10.

As shown in (a) through (c) of FIG. 10, the LCD controller 30 supplies an interrupt signal to the CPU 40 at time T411. This causes the LCD driving section 20 to carry out refreshing during a period between the time T411 and time T412.

The LCD controller 30 causes the LCD driving section 20 to suspend the refreshing during a period between (i) the time T412 at which the LCD driving section 20 ends the refreshing and (ii) a point in time at which a following pausing period has passed.

In a case where the following pausing period ends at time T413, the LCD controller 30 re-supplies an interrupt signal to the CPU 40 at the time T413. In so doing, despite the interrupt signal supplied to the CPU 40, the CPU 40 does not supply an image signal, and therefore the LCD driving section 20 does not carry out refreshing.

In such a case, the LCD controller 30 controls the LCD driving section 20 so that a black image is displayed on the LCD 10 during two consecutive frames (starting at time T414 and at time T415, respectively) including a frame immediately after a frame starting at the time T413.

In a case where the LCD driving section 20 ceases causing the LCD 10 to display the black image at time T416, the LCD controller 30 causes the LCD driving section 20 to suspend the refreshing until the CPU 40 supplies an image signal.

<Modification 2>

Embodiment 4 discussed the example in which, in a case where an image signal is not supplied from the CPU 40 even if an interrupt signal has been supplied to the CPU 40, the display device 1 operates so as to cause the LCD 10 to display a black image during a second frame immediately after a first frame during which the interrupt signal was supplied. However, the present invention is not limited to such an example. For instance, it is possible to cause the LCD 10 to (i) start displaying a black image during a second frame immediately after a first frame during which an interrupt signal was supplied and (ii) continuously display a black image until the CPU 40 supplies an image signal.

Figure 11:
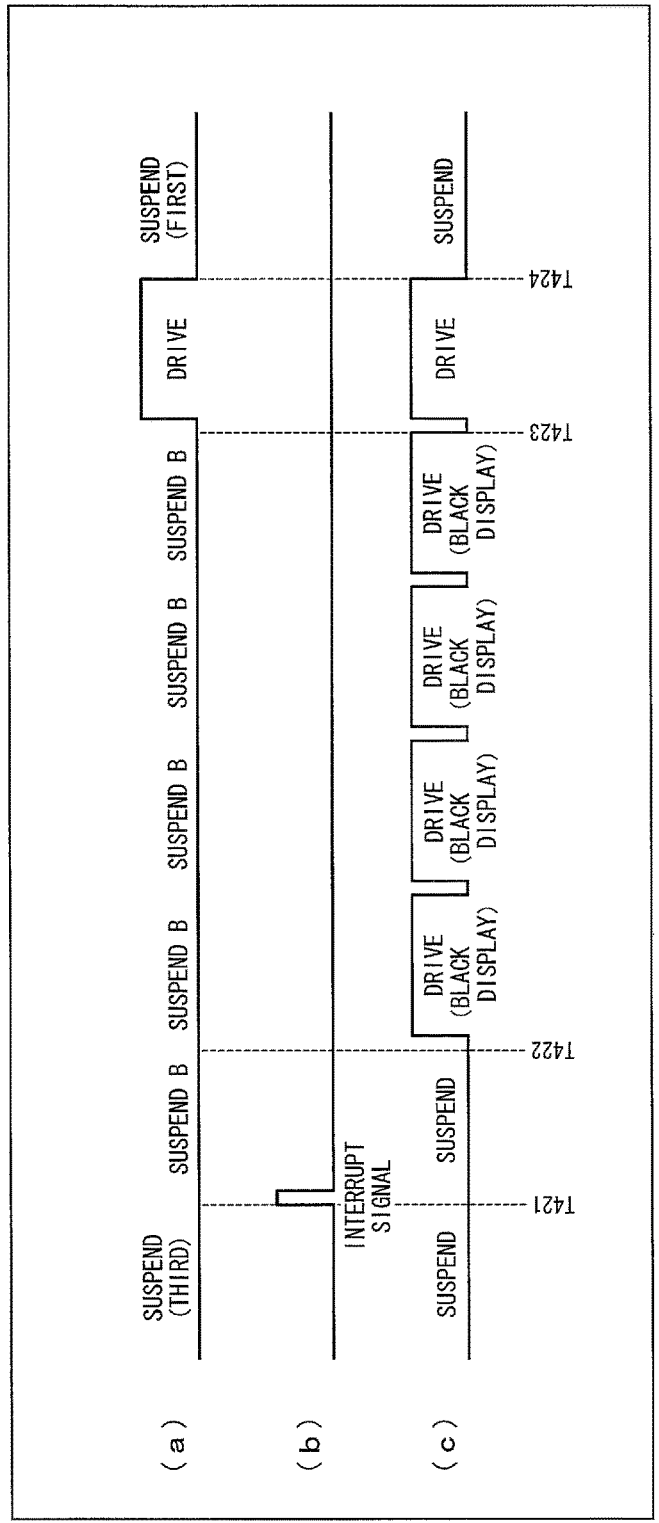
FIG. 11 is a timing chart showing timings with which a display device in accordance with Modification 2 of said further embodiment carries out pause driving.

Pause driving of a display device 1 in accordance with Modification 2 will be described below with reference to FIG. 11. FIG. 11 is a timing chart showing timings with which the display device 1 in accordance with Modification 2 of Embodiment 4 carries out the pause driving. (a) of FIG. 11 shows timings with which a CPU 40 supplies an image signal to an LCD controller 30. (b) of FIG. 11 shows timings with which the LCD controller 30 supplies an interrupt signal to the CPU 40. (c) of FIG. 11 shows timings with which an LCD driving section 20 refreshes an image displayed on an LCD 10.

As shown in (a) through (c) of FIG. 11, although the LCD controller 30 supplies an interrupt signal to the CPU 40 at time T421, the CPU 40 does not supply an image signal and therefore the LCD driving section 20 does not carry out refreshing.

In such a case, the LCD controller 30 controls the LCD driving section 20 so that a black image is displayed on the LCD 10 during a period (i) starting from a frame (starting at time T422) immediately after a frame starting at the time T421 and (ii) ending at a frame immediately before an image signal is supplied.

In a case where the LCD controller 30 receives an image signal from the CPU 40 at time T423, the LCD driving section 20 carries out refreshing during a period between the time T423 and time T424.

In a case where the LCD driving section 20 ends the refreshing at the time T424, the LCD controller 30 causes the LCD driving section 20 to suspend the refreshing until another pausing period passes.

According to the display device 1 of Modification 2 thus configured, in a case where an image signal is not supplied to the LCD driving section 20, the LCD 10 continues to display a black image until an image signal is supplied to the LCD driving section 20. This makes it possible to further prevent the characteristics of the components of the LCD 10 from deteriorating.

<Modification 3>

Embodiment 4 discussed the example in which, in a case where an image signal is not supplied from the CPU 40 even if an interrupt signal has been supplied to the CPU 40, the display device 1 operates so as to cause the LCD 10 to display a black image during a second frame immediately after a first frame during which the interrupt signal was supplied. However, the present invention is not limited to such an example. For instance, it is possible to cause the LCD 10 to (i) start displaying a black image during a second frame immediately after a first frame during which an interrupt signal was supplied and (ii) continuously display a black image until the display device 1 is turned off.

Figure 12:
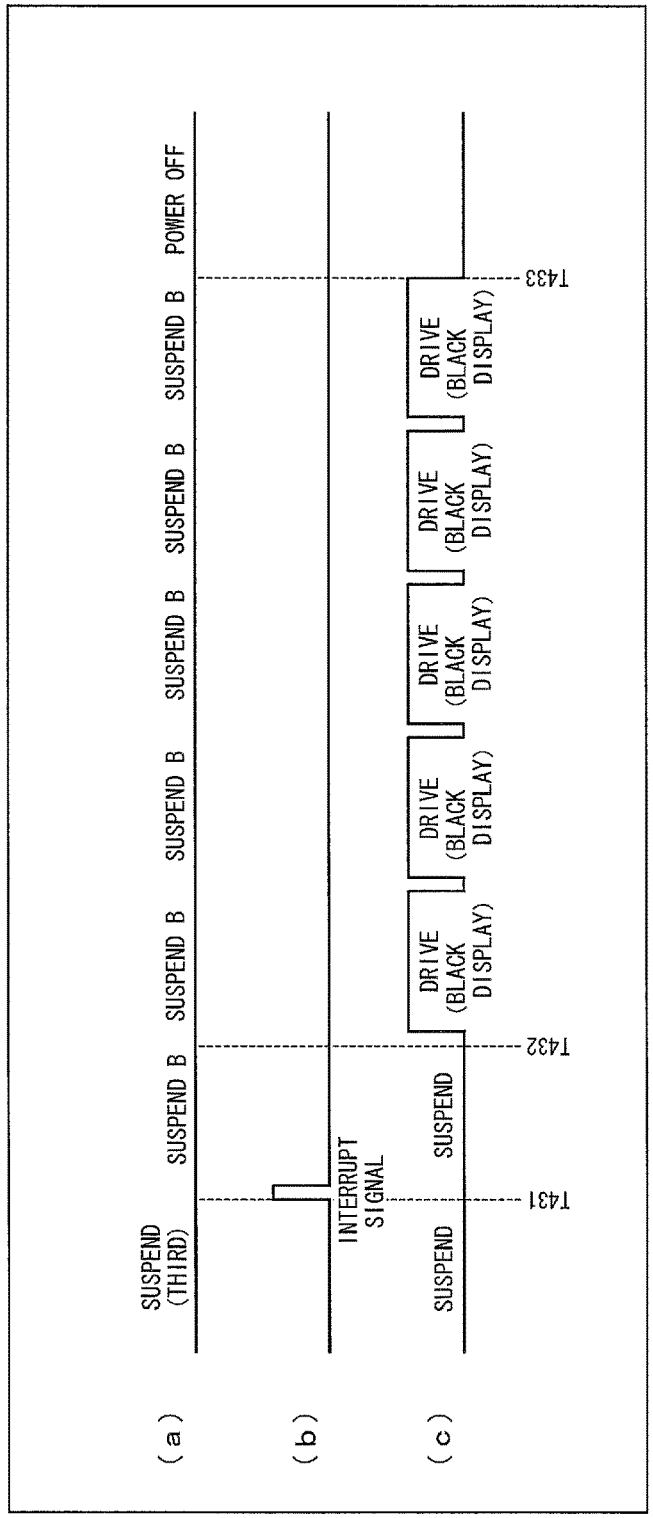
FIG. 12 is a timing chart showing timings with which a display device in accordance with Modification 3 of said further embodiment carries out pause driving.

Pause driving of a display device 1 of Modification 3 will be described below with reference to FIG. 12. FIG. 12 is a timing chart showing timings with which the display device 1 carries out the pause driving. (a) of FIG. 12 shows timings with which a CPU 40 supplies an image signal to an LCD controller 30. (b) of FIG. 12 shows timings with which the LCD controller 30 supplies an interrupt signal to the CPU 40. (c) of FIG. 12 shows timings with which an LCD driving section 20 refreshes an image displayed on an LCD 10.

As shown in (a) through (c) of FIG. 12, although the LCD controller 30 supplies an interrupt signal to the CPU 40 at time T431, the CPU 40 does not supply an image signal and therefore the LCD driving section 20 does not carry out refreshing.

In such a case, the LCD controller 30 controls the LCD driving section 20 so that a black image is displayed on the LCD 10 during a period (i) starting from a frame (starting at time T432) immediately after a frame starting at the time T431 and (ii) ending at a frame immediately before the display device 1 is turned off.

As shown in (a) and (c) of FIG. 12, the LCD controller 30 controls the LCD driving section 20 so that the LCD 10 displays a black image until the display device 1 is turned off at time T433.

According to the display device 1 of Modification 3 thus configured, in a case where an image signal is not supplied to the LCD driving section 20, the LCD 10 continues to display a black image until the display device 1 is turned off. This makes it possible to further prevent the characteristics of the components of the LCD 10 from deteriorating.

<Embodiment 5>

Embodiment 1 discussed the example in which the LCD controller 30 supplies an interrupt signal to the CPU 40 at the end of a pausing period so that the LCD driving section 20 carries out refreshing of an image. However, there may be cases where the CPU 40 fails to supply an image signal (due to malfunctioning of the CPU 40, for example) although an interrupt signal has been supplied to the CPU 40.

In such a case, an LCD controller 30 included in a display device 1 of Embodiment 5 controls an LCD driving section 20 so that electric potentials of pixel electrodes (of pixels included in the LCD 10) and of a common electrode each become equal to a ground potential (i.e. GND level). In so doing, the LCD driving section 20 drives a scan signal line drive circuit so that a voltage is applied to each of gate electrodes of TFTs connected to the pixel electrodes, which voltage causes said each of the TFTs to be turned on. This allows an electric potential of the GND level to be applied to each of the pixel electrodes. Note that hereinafter, such an operation of the LCD driving section 20 to cause the electric potentials of the pixel electrodes and of the common electrode to each become equal to the GND level may be simply referred to as "causing the electric potentials of the pixels of the LCD 10 to become equal to the GND level."

Figure 13:
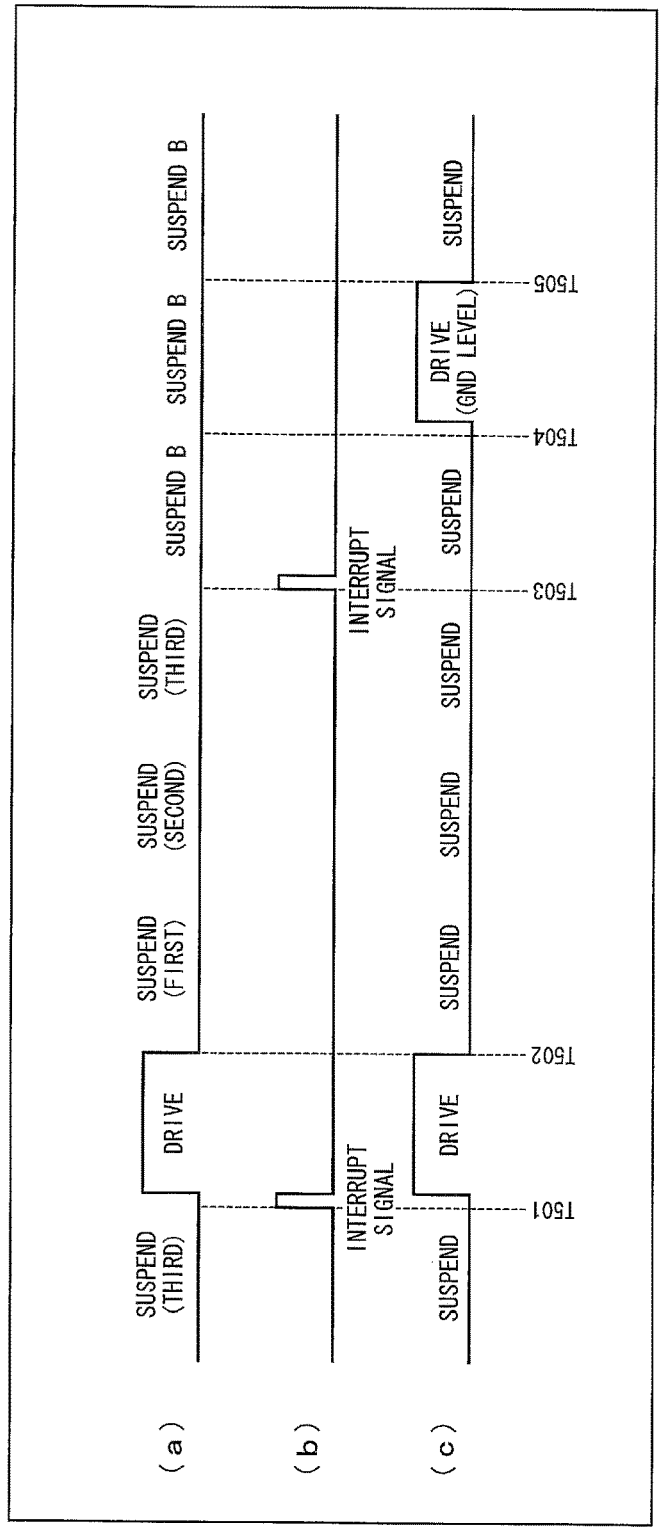
FIG. 13 is a timing chart showing how a display device in accordance with a further embodiment of the present invention carries out pause driving.

Pause driving of the display device 1 in accordance with Embodiment 5 will be described below with reference to FIG. 13. FIG. 13 is a timing chart showing timings with which the display device 1 carries out the pause driving. (a) of FIG. 13 shows timings with which the CPU 40 supplies an image signal to an LCD controller 30. (b) of FIG. 13 shows timings with which the LCD controller 30 supplies an interrupt signal to the CPU 40. (c) of FIG. 13 shows timings with which an LCD driving section 20 refreshes an image displayed on an LCD 10.

As shown in (a) through (c) of FIG. 13, the LCD controller 30 supplies an interrupt signal to the CPU 40 at time T501. This causes the LCD driving section 20 to carry out refreshing during a period between the time T501 and time T502.

The LCD controller 30 causes the LCD driving section 20 to suspend the refreshing during a period between (i) the time T502 at which the LCD driving section 20 ends the refreshing and (ii) a point in time at which a following pausing period has passed.

In a case where the following pausing period ends at time T503, the LCD controller 30 re-supplies an interrupt signal to the CPU 40 at the time T503. In so doing, despite the interrupt signal supplied to the CPU 40, the CPU 40 does not supply an image signal, and therefore the LCD driving section 20 does not carry out refreshing.

In such a case, the LCD controller 30 controls the LCD driving section 20 to cause the electric potentials of the pixels of the LCD 10 to become equal to the GND level during a frame (starting at time T504) immediately after a frame starting at the time T503.

In a case where the LCD driving section 20 causes the electric potentials of the pixels of the LCD 10 to become equal to the GND level at the time T505, the LCD controller 30 causes the LCD driving section 20 to suspend the refreshing until the CPU 40 supplies an image signal.

According to the display device 1 of Embodiment 5 thus configured, it is possible to cause the electric potentials of the pixel electrodes (of the pixels of the LCD 10) and of the common electrode to each become equal to the ground potential in a case where an image signal is not supplied from the CPU 40 even if an interrupt signal has been supplied to the CPU 40. This makes it possible to prevent the characteristics of the components of the LCD 10 from being subject to deterioration caused by an image on the LCD 10 not being refreshed.

<Modification 1>

Embodiment 5 discussed the example in which, in a case where an image signal is not supplied from the CPU 40 even if an interrupt signal has been supplied to the CPU 40, the electric potentials of the pixels of the LCD 10 are made equal to the GND level during a second frame immediately after a first frame during which the interrupt signal was supplied. However, the present invention is not limited to such an example. For instance, it is possible to cause the electric potentials of the pixels of the LCD 10 to become equal to the GND level for a plurality of consecutive frames immediately after a frame during which an interrupt signal was supplied. Modification 1 of Embodiment 5 will discuss an example in which electric potentials of pixels of an LCD 10 are made equal to the GND level for two consecutive frames immediately after a frame during which an interrupt signal was supplied.

Figure 14:
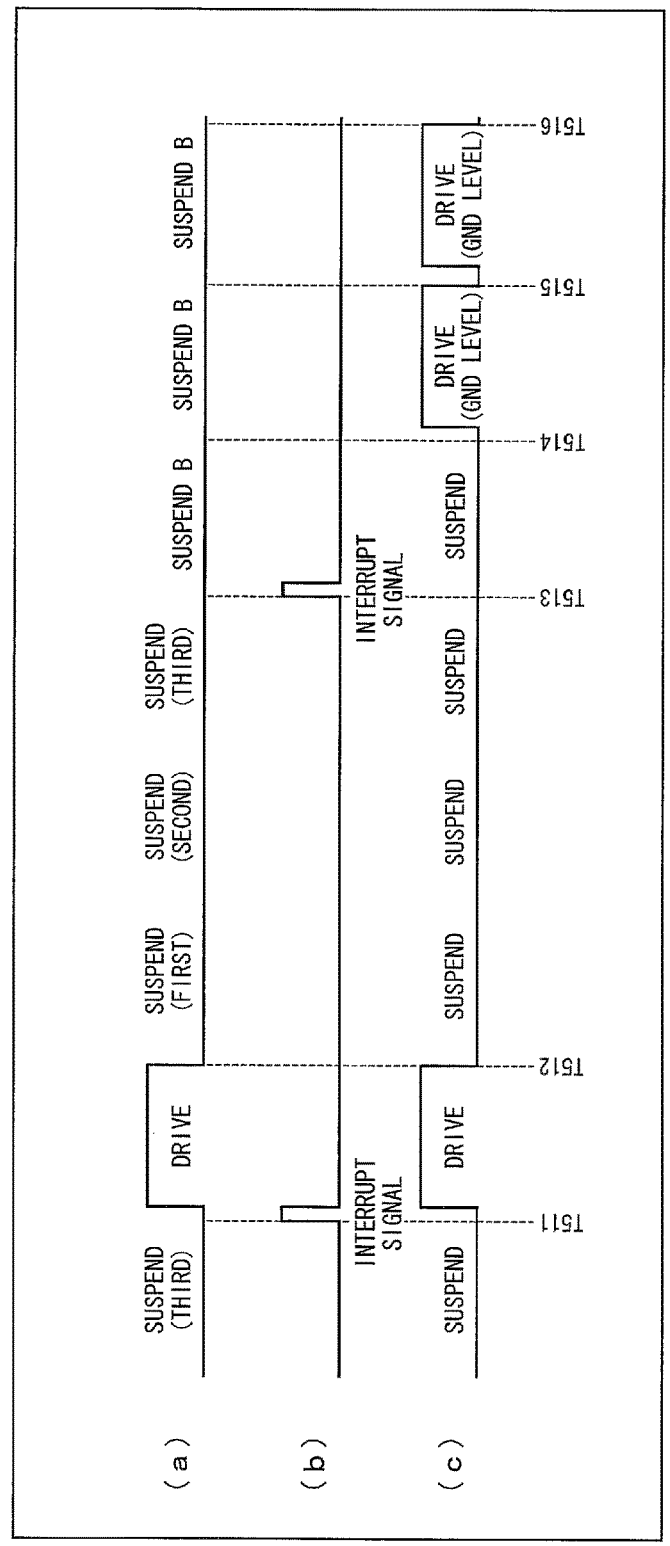
FIG. 14 is a timing chart showing timings with which a display device in accordance with Modification 1 of said further embodiment carries out pause driving.

Pause driving of a display device 1 of Modification 1 will be described below with reference to FIG. 14. FIG. 14 is a timing chart showing timings with which the display device 1 in accordance with Modification 1 of Embodiment 5 carries out the pause driving. (a) of FIG. 14 shows timings with which a CPU 40 supplies an image signal to an LCD controller 30. (b) of FIG. 14 shows timings with which the LCD controller 30 supplies an interrupt signal to the CPU 40. (c) of FIG. 14 shows timings with which an LCD driving section 20 refreshes an image displayed on the LCD 10.

As shown in (a) through (c) of FIG. 14, the LCD controller 30 supplies an interrupt signal to the CPU 40 at time T511. This causes the LCD driving section 20 to carry out refreshing during a period between the time T511 and time T512.

The LCD controller 30 causes the LCD driving section 20 to suspend the refreshing during a period between (i) the time T512 at which the LCD driving section 20 ends the refreshing and (ii) a point in time at which a following pausing period has passed.

In a case where the following pausing period ends at time T513, the LCD controller 30 re-supplies an interrupt signal to the CPU 40 at the time T513. In so doing, despite the interrupt signal supplied to the CPU 40, the CPU 40 does not supply an image signal, and therefore the LCD driving section 20 does not carry out refreshing.

In such a case, the LCD controller 30 controls the LCD driving section 20 to cause the electric potentials of the pixels of the LCD 10 to become equal to the GND level during two consecutive frames (starting at time T514 and time T515, respectively) including a frame immediately after a frame starting at the time T513.

In a case where the LCD driving section 20 ends, at the time T516, the driving of causing the electric potentials of the pixels of the LCD 10 to become equal to the GND level, the LCD controller 30 causes the LCD driving section 20 to suspend the refreshing until the CPU 40 supplies an image signal.

<Modification 2>

Embodiment 5 discussed the example in which, in a case where an image signal is not supplied from the CPU 40 even if an interrupt signal has been supplied to the CPU 40, the electric potentials of the pixels of the LCD 10 are made equal to the GND level during a second frame immediately after a first frame during which the interrupt signal was supplied. However, the present invention is not limited to such an example. For instance, it is possible to cause (i) electric potentials of pixel electrodes of the pixels included in the LCD 10 and (ii) electric potentials of a common electrode to (a) become equal to the GND level during a second frame immediately after a first frame during which an interrupt signal was supplied and (b) continue to be equal to the GND level until the CPU 40 supplies an image signal.

Figure 15:
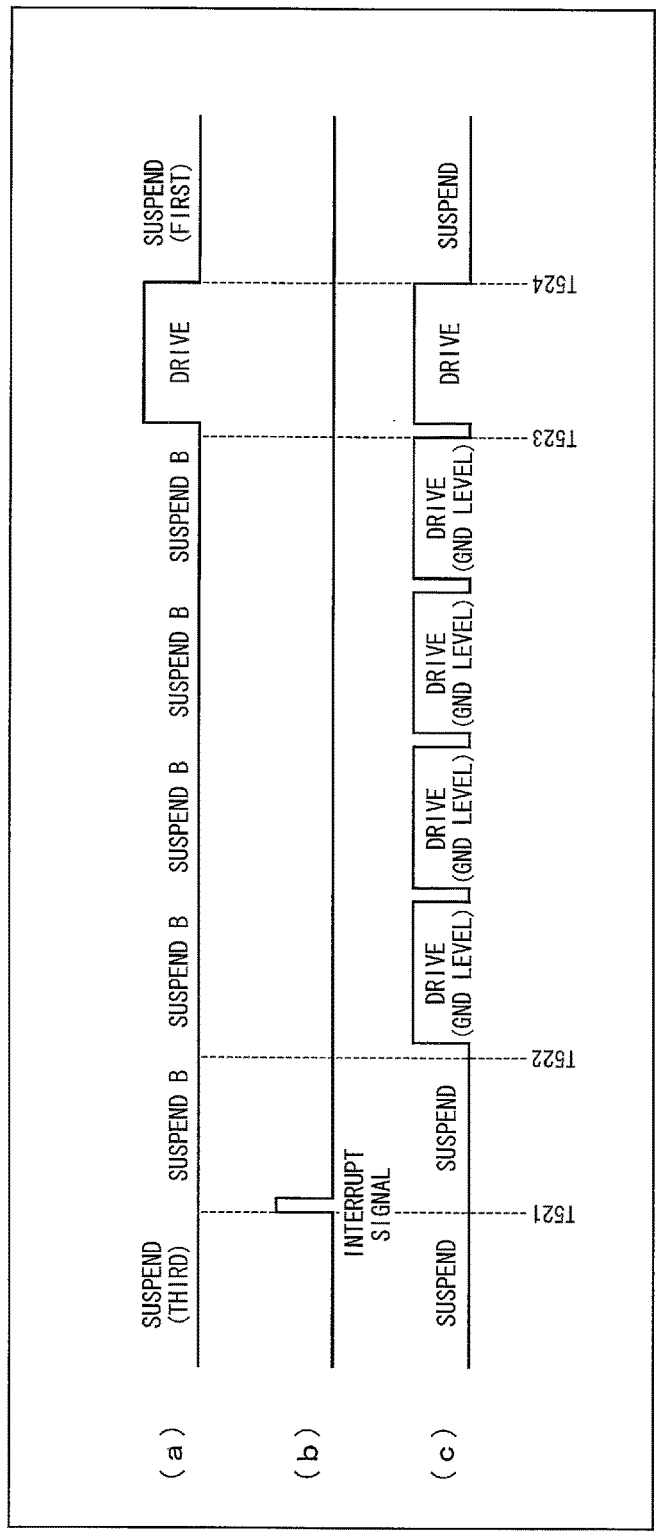
FIG. 15 is a timing chart showing timings with which a display device in accordance with Modification 2 of said further embodiment carries out pause driving.

Pause driving of a display device 1 of Modification 2 will be described below with reference to FIG. 15. FIG. 15 is a timing chart with which the display device 1 in accordance with Modification 2 of Embodiment 5 carries out the pause driving. (a) of FIG. 15 shows timings with which a CPU 40 supplies an image signal to an LCD controller 30. (b) of FIG. 15 shows timings with which the LCD controller 30 supplies an interrupt signal to the CPU 40. (c) of FIG. 15 shows timings with which an LCD driving section 20 refreshes an image displayed on an LCD 10.

As shown in (a) through (c) of FIG. 15, although the LCD controller 30 supplies an interrupt signal to the CPU 40 at time T521, the CPU 40 does not supply an image signal and therefore the LCD driving section 20 does not carry out refreshing.

In such a case, the LCD controller 30 controls the LCD driving section 20 to cause the electric potentials of the pixels of the LCD 10 to become equal to the GND level during a period (i) starting from a frame (starting at time T522) immediately after a frame starting at the time T521 and (ii) ending at a frame immediately before an image signal is supplied.

In a case where the LCD controller 30 receives an image signal from the CPU 40 at time T523, the LCD driving section 20 carries out refreshing during a period between the time T523 and time T524.

In a case where the LCD driving section 20 ends the refreshing at the time T524, the LCD controller 30 causes the LCD driving section 20 to suspend the refreshing until another pausing period passes.

According to the display device 1 of Modification 2 thus configured, in a case where an image signal is not supplied to the LCD driving section 20, the electric potentials of the pixels of the LCD 10 continue to be equal to the ground potential until an image signal is supplied to the LCD driving section 20. This makes it possible to prevent the characteristics of the components of the LCD 10 from deteriorating.

<Modification 3>

Embodiment 5 discussed the example in which, in a case where an image signal is not supplied from the CPU 40 even if an interrupt signal has been supplied to the CPU 40, the electric potentials of the pixels of the LCD 10 are made equal to the GND level during a second frame immediately after a first frame during which the interrupt signal was supplied. However, the present invention is not limited to such an example. For instance, it is possible to cause (i) electric potentials of pixel electrodes of the pixels included in the LCD 10 and (ii) electric potentials of a common electrode to (a) become equal to the GND level during a second frame immediately after a first frame during which an interrupt signal was supplied and (b) continue to be equal to the GND level until the display device 1 is turned off.

Figure 16:
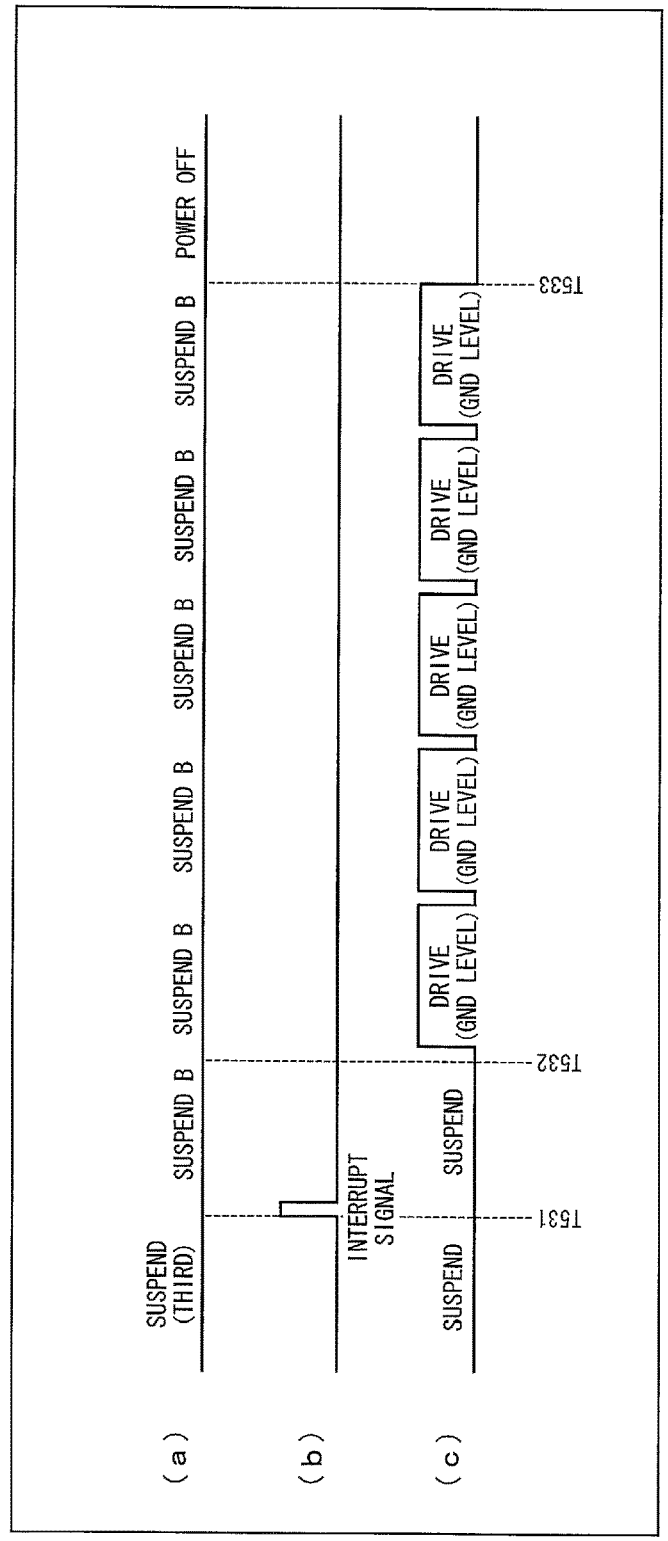
FIG. 16 is a timing chart showing with which a display device in accordance with Modification 3 of said further embodiment carries out pause driving.

Pause driving of a display device 1 of Modification 3 will be described below with reference to FIG. 16. FIG. 16 is a timing chart with which the display device 1 in accordance with Modification 3 of Embodiment 5 carries out the pause driving. (a) of FIG. 16 shows timings with which a CPU 40 supplies an image signal to an LCD controller 30. (b) of FIG. 16 shows timings with which the LCD controller 30 supplies an interrupt signal to the CPU 40. (c) of FIG. 16 shows timings with which an LCD driving section 20 refreshes an image displayed on an LCD 10.

As shown in (a) through (c) of FIG. 16, although the LCD controller 30 supplies an interrupt signal to the CPU 40 at time T531, the CPU 40 does not supply an image signal and therefore the LCD driving section 20 does not carry out refreshing.

In such a case, the LCD controller 30 controls the LCD driving section 20 so as to cause the electric potentials of the pixels of the LCD 10 to become equal to the GND level during a period (i) starting from a frame (starting at time T532) immediately after a frame starting from the time T531 and (ii) ending at a frame immediately before the display device 1 is turned off at time T533 (see (a) through (c) of FIG. 16).

According to the display device 1 of Modification 3 thus configured, in a case where an image signal is not supplied to the LCD driving section 20, the electric potentials of the pixels of the LCD 10 continue to be equal to the ground potential until the display device 1 is turned off. This makes it possible to further prevent the components of the LCD 10 from deteriorating.

<Embodiment 6>

Embodiment 1 discussed the example in which the LCD controller 30 supplies an interrupt signal to the CPU 40 at the end of a pausing period so that the LCD driving section 20 carries out refreshing of an image. However, there may be cases where the CPU 40 fails to supply an image signal (due to malfunctioning of the CPU 40, for example) although an interrupt signal has been supplied to the CPU 40.

In such a case, an LCD controller 30 included in a display device 1 of Embodiment 6 controls an LCD driving section 20 so that electric potentials of pixel electrodes (of pixels included in the LCD 10) and of a common electrode each become equal to a common potential other than a GND level. In so doing, the LCD driving section 20 drives a scan signal line drive circuit so that a voltage is applied to each of gate electrodes of TFTs connected to the pixel electrodes, which voltage causes said each of the TFTs to be turned on. This allows an electric potential, which is equal to an electric potential applied to the common electrode, to be applied to each of the pixel electrodes. Note that hereinafter, such an operation of the LCD driving section 20 to cause the electric potentials of the pixel electrodes and of the common electrode to each become equal to the common potential may be simply referred to as "causing the electric potentials of the pixels of the LCD 10 to become equal to the common potential."

Figure 17:
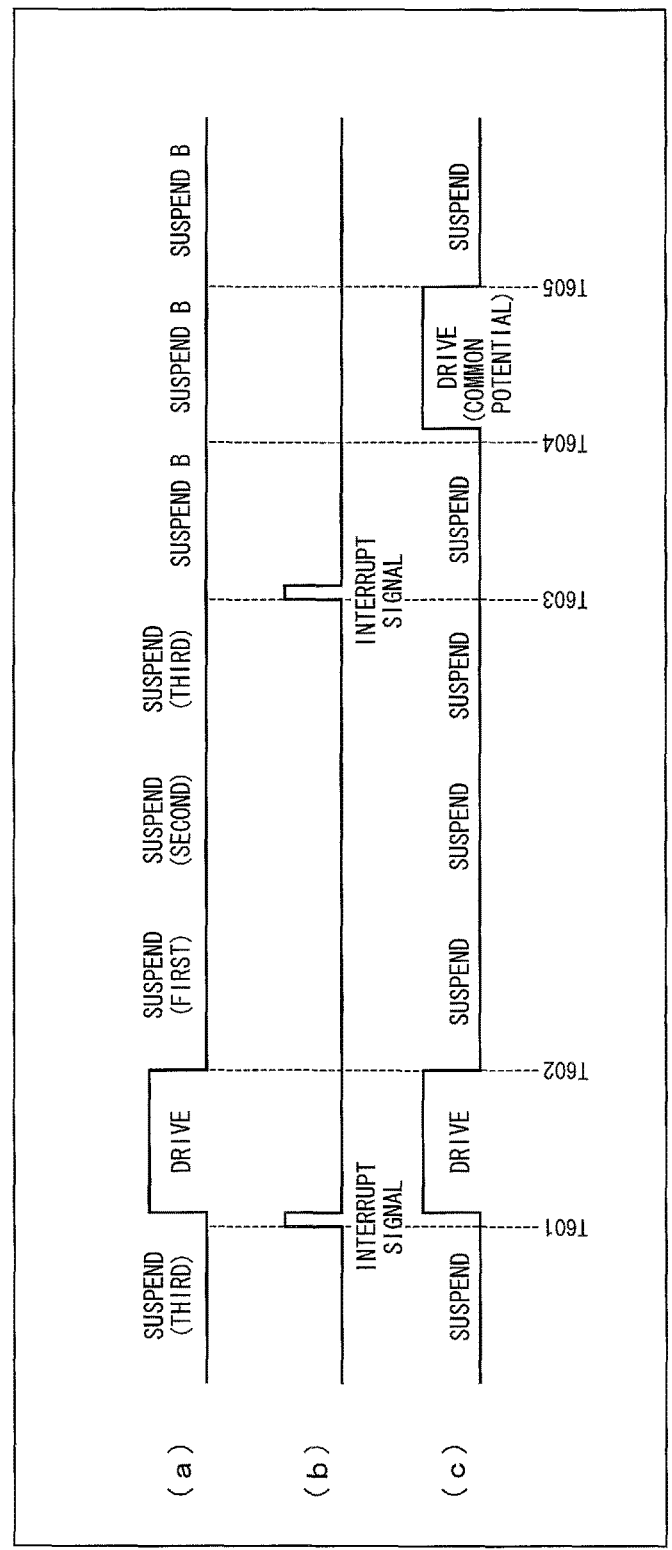
FIG. 17 is a timing chart showing how a display device in accordance with a further embodiment of the present invention carries out pause driving.

Pause driving of the display device 1 in accordance with Embodiment 6 will be described below with reference to FIG. 17. FIG. 17 is a timing chart showing timings with which the display device 1 carries out the pause driving. (a) of FIG. 17 shows timings with which the CPU 40 supplies an image signal to an LCD controller 30. (b) of FIG. 17 shows timings with which the LCD controller 30 supplies an interrupt signal to the CPU 40. (c) of FIG. 17 shows timings with which an LCD driving section 20 refreshes an image displayed on an LCD 10.

As shown in (a) through (c) of FIG. 17, the LCD controller 30 supplies an interrupt signal to the CPU 40 at time T601. This causes the LCD driving section 20 to carry out refreshing during a period between the time T601 and time T602.

The LCD controller 30 causes the LCD driving section 20 to suspend the refreshing during a period between (i) the time T602 at which the LCD driving section 20 ends the refreshing and (ii) a point in time at which a following pausing period has passed.

In a case where the following pausing period ends at time T603, the LCD controller 30 re-supplies an interrupt signal to the CPU 40 at the time T603. In so doing, despite the interrupt signal supplied to the CPU 40, the CPU 40 does not supply an image signal, and therefore the LCD driving section 20 does not carry out refreshing.

In such a case, the LCD controller 30 controls the LCD driving section 20 to cause the electric potentials of the pixels of the LCD 10 to become equal to the common potential during a frame (starting at time T604) immediately after a frame starting at the time T603.

In a case where the LCD driving section 20 causes the electric potentials of the pixels of the LCD 10 to become equal to the common potential at the time T605, the LCD controller causes the LCD driving section 20 to suspend the refreshing until the CPU 40 supplies an image signal.

According to the display device 1 of Embodiment 6 thus configured, it is possible to cause the electric potentials of the pixel electrodes (of the pixels of the LCD 10) and of the common electrode to each become equal to the common potential in a case where an image signal is not supplied from the CPU 40 even if an interrupt signal has been supplied to the CPU 40. This makes it possible to prevent the characteristics of the components of the LCD 10 from being subject to deterioration caused by an image on the LCD 10 not being refreshed.

<Modification 1>

Embodiment 6 discussed the example in which, in a case where an image signal is not supplied from the CPU 40 even if an interrupt signal has been supplied to the CPU 40, the electric potentials of the pixels of the LCD 10 are made equal to the common potential during a second frame immediately after a first frame during which the interrupt signal was supplied. However, the present invention is not limited to such an example. For instance, it is possible to cause the electric potentials of the pixels of the LCD 10 to become equal to the common potential for a plurality of consecutive frames immediately after a frame during which an interrupt signal was supplied. Modification 1 of Embodiment 6 will discuss an example in which electric potentials of pixels of an LCD 10 are made equal to the common potential for two consecutive frames immediately after a frame during which an interrupt signal was supplied.

Figure 18:
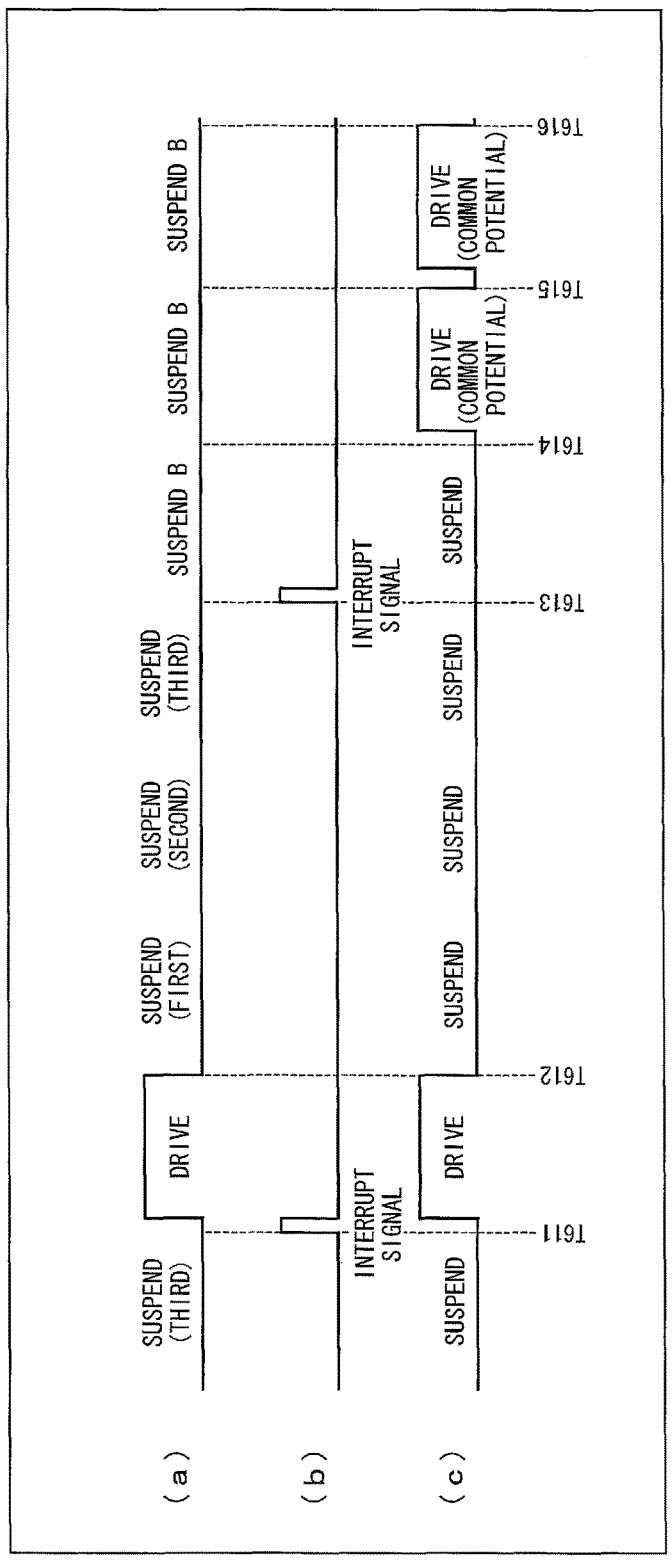
FIG. 18 is a timing chart showing timings with which a display device in accordance with Modification 1 of said further embodiment carries out pause driving.

Pause driving of a display device 1 of Modification 1 will be described below with reference to FIG. 18. FIG. 18 is a timing chart showing timings with which the display device 1 in accordance with Modification 1 of Embodiment 6 carries out the pause driving. (a) of FIG. 18 shows timings with which a CPU 40 supplies an image signal to an LCD controller 30. (b) of FIG. 18 shows timings with which the LCD controller 30 supplies an interrupt signal to the CPU 40. (c) of FIG. 18 shows timings with which an LCD driving section 20 refreshes an image displayed on the LCD 10.

As shown in (a) through (c) of FIG. 18, the LCD controller 30 supplies an interrupt signal to the CPU 40 at time T611. This causes the LCD driving section 20 to carry out refreshing during a period between the time T611 and time T612.

The LCD controller 30 causes the LCD driving section 20 to suspend the refreshing during a period between (i) the time T612 at which the LCD driving section 20 ends the refreshing and (ii) a point in time at which a following pausing period has passed.

In a case where the following pausing period ends at time T613, the LCD controller 30 re-supplies an interrupt signal to the CPU 40 at the time T613. In so doing, despite the interrupt signal supplied to the CPU 40, the CPU 40 does not supply an image signal, and therefore the LCD driving section 20 does not carry out refreshing.

In such a case, the LCD controller 30 controls the LCD driving section 20 to cause the electric potentials of the pixels of the LCD 10 to become equal to the common potential during two consecutive frames (starting at time T614 and time T615, respectively) including a frame immediately after a frame starting at the time T613.

In a case where the LCD driving section 20 ends, at the time T615, the driving of causing the electric potentials of the pixels of the LCD 10 to become equal to the common potential, the LCD controller 30 causes the LCD driving section 20 to suspend the refreshing until the CPU 40 supplies an image signal.

<Modification 2>

Embodiment 6 discussed the example in which, in a case where an image signal is not supplied from the CPU 40 even if an interrupt signal has been supplied to the CPU 40, the electric potentials of the pixels of the LCD 10 are made equal to the common potential during a second frame immediately after a first frame during which the interrupt signal was supplied. However, the present invention is not limited to such an example. For instance, it is possible to cause electric potentials of the pixels of the LCD 10 to (a) become equal to the common potential during a second frame immediately after a first frame during which an interrupt signal was supplied and (b) continue to be equal to the common potential until the CPU 40 supplies an image signal.

Figure 19:
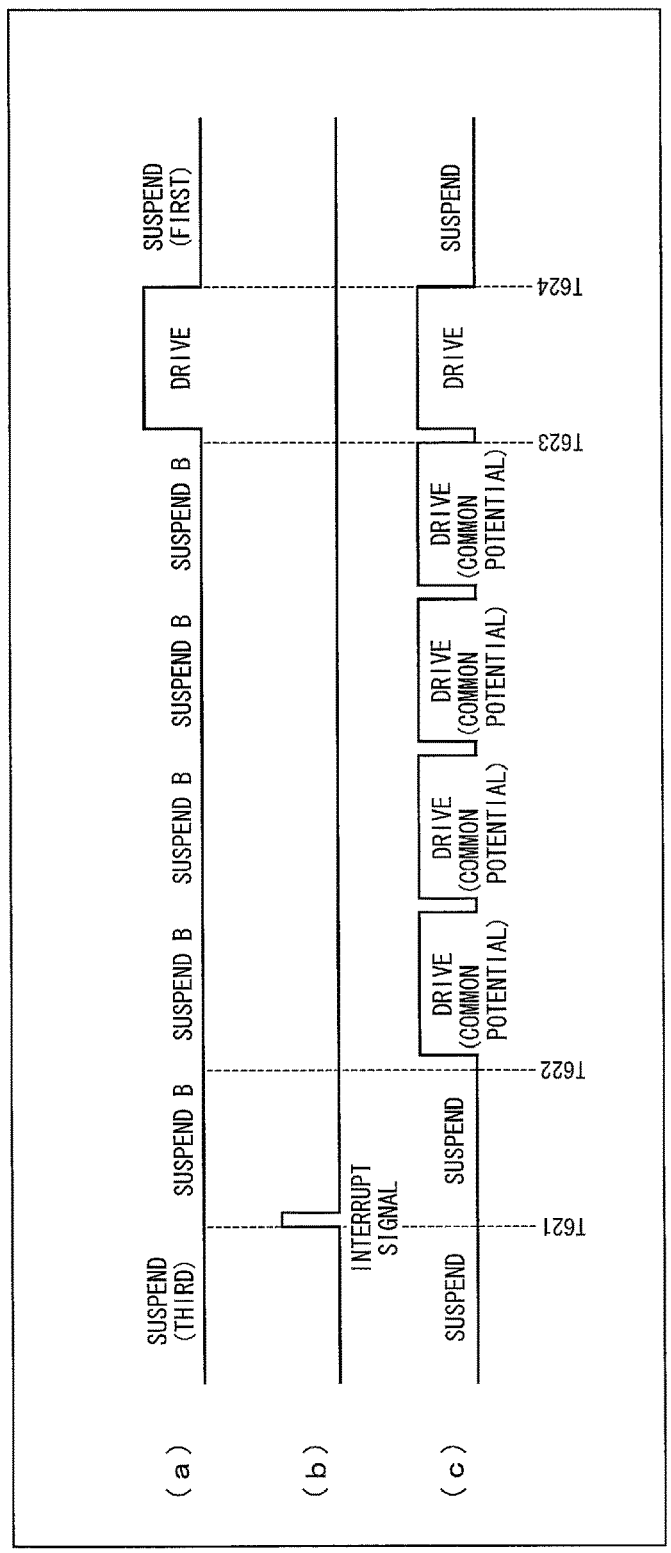
FIG. 19 is a timing chart showing timings with which a display device in accordance with Modification 2 of said further embodiment carries out pause driving.

Pause driving of a display device 1 of Modification 2 will be described below with reference to FIG. 19. FIG. 19 is a timing chart with which the display device 1 in accordance with Modification 2 of Embodiment 6 carries out the pause driving. (a) of FIG. 19 shows timings with which a CPU 40 supplies an image signal to an LCD controller 30. (b) of FIG. 19 shows timings with which the LCD controller 30 supplies an interrupt signal to the CPU 40. (c) of FIG. 19 shows timings with which an LCD driving section 20 refreshes an image displayed on an LCD 10.

As shown in (a) through (c) of FIG. 19, although the LCD controller 30 supplies an interrupt signal to the CPU 40 at time T621, the CPU 40 does not supply an image signal and therefore the LCD driving section 20 does not carry out refreshing.

In such a case, the LCD controller 30 controls the LCD driving section 20 to cause the electric potentials of the pixels of the LCD 10 to become equal to the common potential during a period (i) starting from a frame (starting at time T622) immediately after a frame starting at the time T621 and (ii) ending at a frame immediately before an image signal is supplied.

In a case where the LCD controller 30 receives an image signal from the CPU 40 at time T623, the LCD driving section 20 carries out refreshing during a period between the time T623 and time T624.

In a case where the LCD driving section 20 ends the refreshing at the time T624, the LCD controller 30 causes the LCD driving section 20 to suspend the refreshing until another pausing period passes.

According to the display device 1 of Modification 2 thus configured, in a case where an image signal is not supplied to the LCD driving section 20, the electric potentials of the pixels of the LCD 10 continue to be equal to the common potential until an image signal is supplied to the LCD driving section 20. This makes it possible to prevent the characteristics of the components of the LCD 10 from deteriorating.

<Modification 3>

Embodiment 6 discussed the example in which, in a case where an image signal is not supplied from the CPU 40 even if an interrupt signal has been supplied to the CPU 40, the electric potentials of the pixels of the LCD 10 are made equal to the common potential during a second frame immediately after a first frame during which the interrupt signal was supplied. However, the present invention is not limited to such an example. For instance, it is possible to cause (i) electric potentials of pixel electrodes of the pixels included in the LCD 10 and (ii) electric potentials of a common electrode to (a) become equal to the common potential during a second frame immediately after a first frame during which an interrupt signal was supplied and (b) continue to be equal to the common potential until the display device 1 is turned off.

Figure 20:
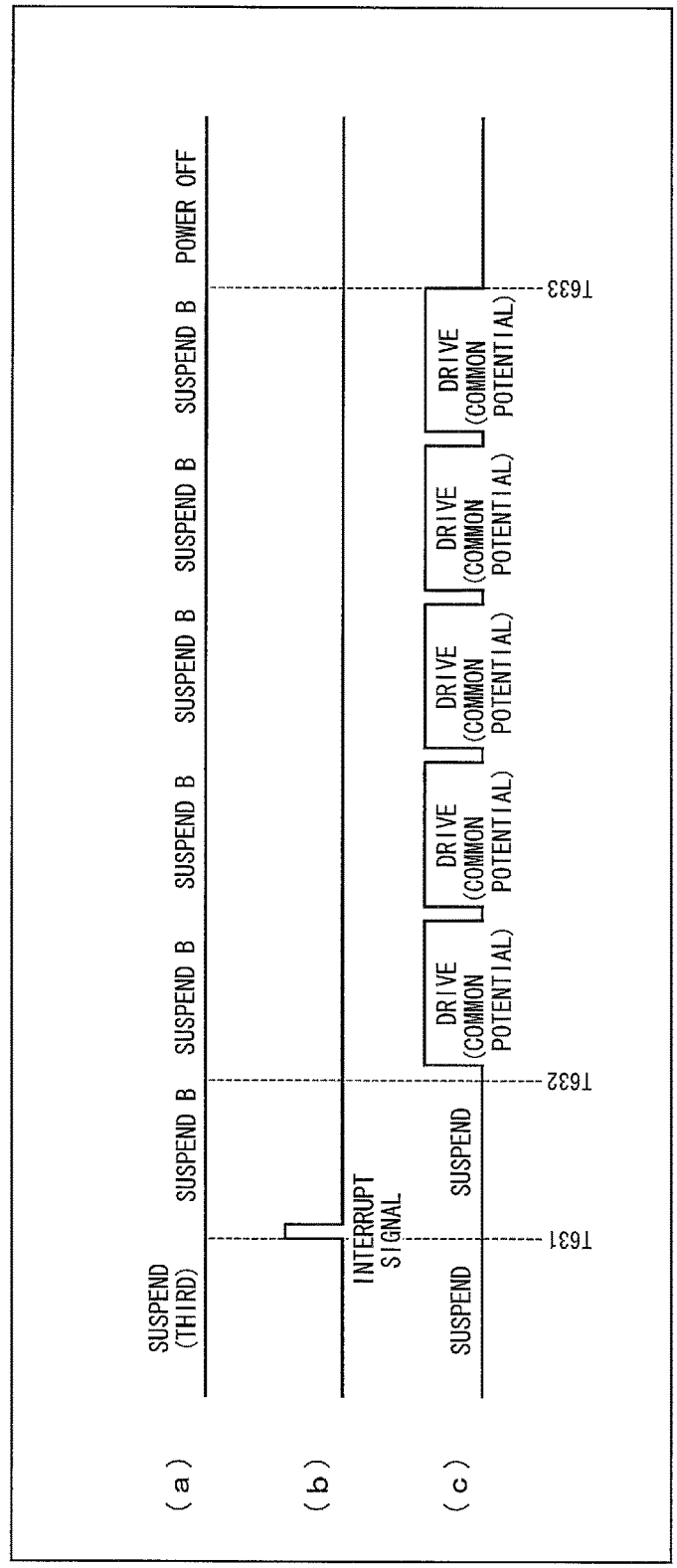
FIG. 20 is a timing chart showing timings with which a display device in accordance with Modification 3 of said further embodiment carries out pause driving.

Pause driving of a display device 1 of Modification 3 will be described below with reference to FIG. 20. FIG. 20 is a timing chart with which the display device 1 in accordance with Modification 3 of Embodiment 6 carries out the pause driving. (a) of FIG. 20 shows timings with which a CPU 40 supplies an image signal to an LCD controller 30. (b) of FIG. 20 shows timings with which the LCD controller 30 supplies an interrupt signal to the CPU 40. (c) of FIG. 20 shows timings with which an LCD driving section 20 refreshes an image displayed on an LCD 10.

As shown in (a) through (c) of FIG. 20, although the LCD controller 30 supplies an interrupt signal to the CPU 40 at time T631, the CPU 40 does not supply an image signal and therefore the LCD driving section 20 does not carry out refreshing.

In such a case, the LCD controller 30 controls the LCD driving section 20 so as to cause the electric potentials of the pixels of the LCD 10 to become equal to the common potential during a period (i) starting from a frame (starting at time T632) immediately after a frame starting from the time T631 and (ii) ending at a frame immediately before the display device 1 is turned off at time T633 (see (a) through (c) of FIG. 20).

According to the display device 1 of Modification 3 thus configured, in a case where an image signal is not supplied to the LCD driving section 20, the electric potentials of the pixels of the LCD 10 continue to be equal to the common potential until the display device 1 is turned off. This makes it possible to further prevent the components of the LCD 10 from deteriorating.

[Characteristics of TFT Made of Oxide Semiconductor]

While the TFTs of the LCD 10 are not limited to any particular ones in the above embodiments, it is possible to use, as the TFTs, TFTs each including a semiconductor layer made of a so-called oxide semiconductor. Examples of the oxide semiconductor encompass IGZO (InGaZnOx).

Figure 21:
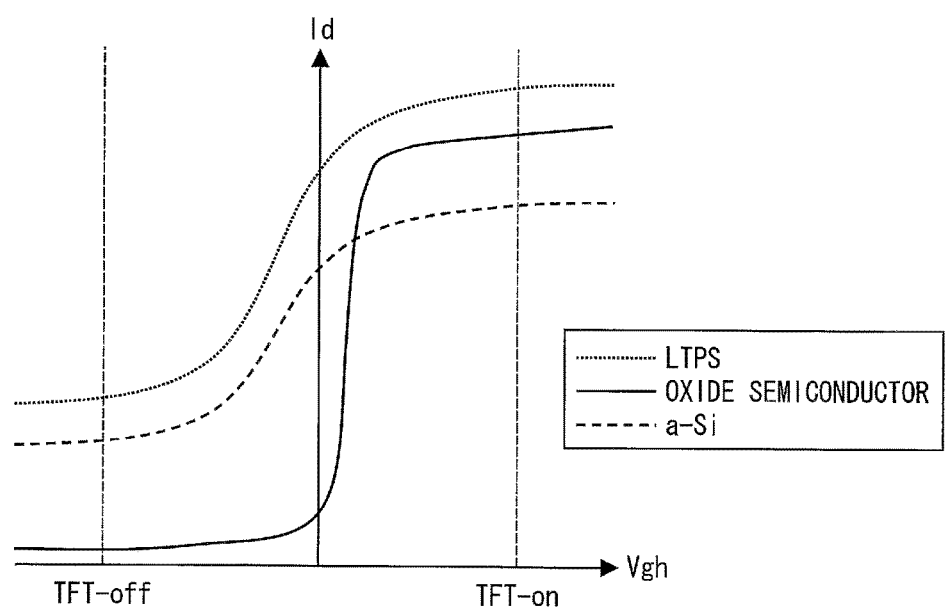
FIG. 21 is a graph showing respective characteristics of (i) a TFT made of an oxide semiconductor, (ii) a TFT made of a-Si, and (iii) a TFT made of LTPS, in a case where any of these TFTs is to be used in the display device in accordance with each of the above embodiments of the present invention.

Characteristics of a TFT made of an oxide semiconductor will be described below with reference to FIG. 21. FIG. 21 is a view showing characteristics of various TFTs. Specifically, FIG. 21 shows respective characteristics of (i) a TFT made of an oxide semiconductor, (ii) a TFT made of a-Si (amorphous silicon), and (iii) a TFT made of LTPS (Low Temperature Poly Silicon).

In FIG. 21, a horizontal axis (Vgh) represents a voltage value of on-voltage that is supplied to a gate in each of the TFTs, and a vertical axis (Id) represents the amount of an electric current between a source and a drain in each of the TFTs.

In particular, (i) a period indicated as "TFT-on" in FIG. 21 represents a period during which each TFT is turned on in response to the voltage value of an on-voltage and (ii) a period indicated as "TFT-off" in FIG. 21 represents a period during which each TFT is turned off in response to the voltage value of an off-voltage.

As shown in FIG. 21, the TFT made of an oxide semiconductor is approximately 20 times to 50 times higher in electron mobility in an on state than the TFT made of a-Si, and therefore has an excellent on-state characteristic. This makes it easy to set a high refresh rate.

By employing TFTs each made of an oxide semiconductor having such an excellent on-state characteristic, the LCD 10 of the display device 1 in accordance with the above embodiments can be configured to drive the pixels with the use of smaller TFTs. This allows the LCD 10 to be configured such that the TFTs take up a smaller percentage of surface area of the respective pixels. In other words, it is possible to increase an aperture ratio of each pixel so as to increase transmissivity of light from a backlight. As a result, it is possible to employ a low-power-consumption backlight and/or suppress brightness of the backlight. This allows a reduction in power consumption.

In addition, since the off-state characteristic of each of the TFTs is excellent, it is possible to reduce an amount of time required for writing an image signal into each of the pixels. This allows an increase in refresh rate of the LCD 10.

Furthermore, as shown in FIG. 21, the TFT made of an oxide semiconductor is approximately 1/100 as high in electron mobility in an off state as the TFT made of a-Si. This shows that the TFT made of an oxide semiconductor has an off-state characteristic so excellent that a leak current hardly occurs. Since the TFTs have such an excellent off-state characteristic, it is possible to set a low refresh rate.

By employing, for each of the pixels, a TFT made of an oxide semiconductor having such an excellent off-state characteristic, the LCD 10 of the above embodiments can be configured to maintain, for an extended period of time, a state in which an image signal is being written into each of the pixels of LCD 10. This allows the refresh rate of the LCD 10 to be easily set low.

Therefore, the pausing periods described in the above embodiments can be set longer. Specifically, it is possible to cause a period, which starts after an image on the LCD 10 is once refreshed and lasts until the image is refreshed again, to be long. This allows the number of times the LCD driving section 20 carries out refreshing to be minimized according to the display device 1 in accordance with the above embodiments. Therefore, it is possible to further reduce electric power consumption required for the refreshing.

[Program, Storage Medium]

The LCD controller 30 and the CPU 40 included in the display device 1 may be realized by hardware such as a logic circuit provided in an integrated circuit (IC chip) or may be realized by software as executed by a CPU (Central Processing Unit).

In the latter case, the LCD controller 30 and the CPU 40 each include (I) a CPU for executing a command of a program for achieving a function, (II) storage devices (storage media) such as (i) a ROM (Read Only Memory) for storing the program, (ii) a RAM (Random Access Memory) for extracting the program, (iii) a memory for storing the program and various types of data, and (III) the like. The object of the present invention can also be attained by (a) providing a storage medium in each of the LCD controller 30 and the CPU 40, the storage medium having stored (in a computer-readable manner) program codes (executable program, intermediate code program, and source program) of a control program for each of the LCD controller 30 and the CPU 40, which control program is a piece of software for achieving the function and (b) causing the computer (or CPU or MPU) to read out and then execute the program codes thus stored in the storage medium.

Examples of the storage medium encompass (i) tapes such as a magnetic tape and a cassette tape, (ii) disks including magnetic disks such as a floppy disk (Registered Trademark) and a hard disk and optical disks such as a CD-ROM, an MO, an MD, a DVD, and a CD-R, (iii) cards such as an IC card (including a memory card) and an optical card, (iv) semiconductor memories such as a mask ROM, an EPROM, an EEPROM (Registered Trademark), and a flash ROM, and (v) logic circuits such as a PLD (Programmable logic device) and an FPGA (Field Programmable Gate Array).

Furthermore, the program code may be supplied to the LCD controller 30 and the CPU 40 via a communications network. The communications network is not limited to any particular one, provided that the program code can be transmitted via the communications network. Examples of the communications network encompass the Internet, an intranet, an extranet, a LAN, an ISDN, a VAN, a CATV communications network, a virtual dedicated network (virtual private network), a telephone line network, a mobile communications network, and a satellite communications network. A transfer medium for constituting the communications network only needs to be a medium via which the program code can be transmitted, and is not limited to any particular configuration or any type. Examples of the transfer medium encompass (i) wired lines such as IEEE 1394, a USB, an electric power line, a cable TV line, a telephone line, and an ADSL (Asymmetric Digital Subscriber Line) and (ii) wireless communications such as an infrared radiation (e.g. IrDA and remote control), Bluetooth (Registered Trademark), IEEE 802.11 wireless, HDR (High Data Rate), NFC (Near Field Communication), DLNA (Digital Living Network Alliance), a mobile telephone network, a satellite line, and a terrestrial digital network.

[Summary]

As described above, a display device (display device 1) in accordance with an embodiment of the present invention includes: displaying means (LCD driving section 20, LCD controller 30) for causing an image based on an image signal to be displayed on a display (LCD 10); and image signal supplying means (CPU 40) for supplying the image signal to the displaying means, the displaying means being configured to supply, to the image signal supplying means, a control signal that instructs the image signal supplying means to supply an image signal, and the image signal supplying means being configured to supply an image signal in a case where the image signal supplying means receives a control signal.

As described above, a method in accordance with an embodiment of the present invention is a method of controlling a display device, said display device including: displaying means for causing an image based on an image signal to be displayed on a display; and image signal supplying means for supplying the image signal to the displaying means, said method including the steps of: causing the displaying means to supply, to the image signal supplying means, a control signal that instructs the image signal supplying means to supply an image signal; and causing the image signal supplying means to supply an image signal in a case where the image signal supplying means receives a control signal.

According to the configuration, the displaying means can receive an image signal (refreshing an image) directly from the image signal supplying means by supplying a control signal. Therefore, according to the display device, an image signal to be used by the displaying means for refreshing an image does not need to be stored in a frame memory. In other words, the displaying means does not need to include a frame memory for storing image signals. Therefore, the display device can be configured to suspend refreshing during a suspending period determined by a period between (i) a point in time where a given control signal is supplied and (ii) a point in time where a following control signal is supplied. This allows a reduction in electric power consumption as well as a reduction in cost required for including a frame memory.

In addition, according to the display device, the displaying means can set the length of the suspending period. This makes it possible to set suspending periods whose lengths are suitable for the characteristics of the display. Therefore, it is possible to prevent the characteristics of the components (e.g. TFTs, LCD materials for the LCD, and the like) included in the LCD 10 from being subject to deterioration caused by the incompatibility between the characteristics of the components and those of the display.

The display device is preferably configured such that the displaying means supplies a control signal to the image signal supplying means a plurality of times.

According to the configuration, the displaying means can receive, a plurality of times, an image signal for refreshing an image. Therefore, even in a case where an electric potential of each pixel of the display does not reach a predetermined electric potential by carrying out the refreshing once, the displaying means can cause the electric potential of each pixel to reach the predetermined electric potential by carrying out the refreshing a plurality of times. This allows display quality to be maintained.

The display device is preferably configured such that, in a case where an image signal is supplied from the image signal supplying means without a control signal having been supplied, the displaying means causes an image to be refreshed in accordance with the image signal thus supplied.

With the display device thus configured, even in a case where an image signal is supplied from the image signal supplying means during a suspending period, it is possible to refresh, in accordance with the image signal thus supplied, an image displayed on the display.

The display device is preferably configured such that, in a case where an image signal is not supplied even if a control signal has been supplied to the image signal supplying means, the displaying means supplies a control signal at least one additional time.

With the display device thus configured, even in a case where an image signal is not supplied by supplying a control signal to the image signal supplying means only once, it is possible to receive an image signal from the image signal supplying means by further supplying a control signal(s). This allows the displaying means to refresh an image.

The display device is preferably configured such that the displaying means supplies a control signal to the image signal supplying means each time a fixed period of times passes.

With the display device thus configured, even in a case where an image signal is not supplied by supplying a control signal to the image signal supplying means only once, it is possible to receive an image signal from the image signal supplying means by further supplying a control signal each time a fix period of time passes. This allows the displaying means to refresh an image.

The display device is preferably configured such that, in a case where an image signal is not supplied even if a control signal has been supplied to the image signal supplying means, the displaying means causes a black image to be displayed on the display at least once.

According to the configuration, in a case where an image signal is not supplied even if a control signal has been supplied to the image signal supplying means, the displaying means causes a black image to be displayed on the display. This makes it possible for the display device to prevent the characteristics of the components of the display from being subject to deterioration caused by an image on the display not being refreshed.

The display device is preferably configured such that the displaying means causes the black image to be continuously displayed on the display until an image signal is supplied.

The display device is preferably configured such that the displaying means causes the black image to be continuously displayed on the display until the display device is turned off.

According to the configuration, in a case where an image signal is not supplied even if a control signal has been supplied to the image signal supplying means, the displaying means causes the black image to be continuously displayed on the display until (i) an image signal is supplied or (ii) the display device is turned off. This further prevents the deterioration of the components included in the display.

The display device is preferably configured such that, in a case where an image signal is not supplied even if a control signal has been supplied to the image signal supplying means, the displaying means causes an electric potential of each of pixels included in the display to be equal to a ground potential at least once.

According to the display device thus configured, in a case where an image signal is not supplied even if a control signal has been supplied to the image signal supplying means, the electric potential of each of the pixels included in the display is made equal to the ground potential. This makes it possible to prevent the characteristics of the components of the display from being subject to deterioration caused by an image on the display not being refreshed.

The display device is preferably configured such that the displaying means causes the electric potential of the each of the pixels to be continuously equal to the ground potential until an image signal is supplied.

The display device is preferably configured such that the displaying means causes the electric potential of the each of the pixels to be continuously equal to the ground potential until the display device is turned off.

According to the configuration, in a case where an image signal is not supplied even if a control signal has been supplied to the image signal supplying means, the displaying means causes the electric potential of each pixel included in the display to be continuously equal to the ground potential until (i) an image signal is supplied or (ii) the display device is turned off. This further prevents the deterioration of the components included in the display.

The display device is preferably configured such that: each of pixels included in the display includes a pixel electrode and a common electrode; and, in a case where an image signal is not supplied even if a control signal has been supplied to the image signal supplying means, the displaying means causes, at least once, respective electric potentials of the pixel electrode and of the common electrode to be each equal to a common potential which is different from a GND level.

According to the display device thus configured, in a case where an image signal is not supplied even if a control signal has been supplied to the image signal supplying means, the electric potential of each pixel of the display is made equal to a common potential which is different from the GND level. This makes it possible to prevent the characteristics of the components of the display from being subject to deterioration caused by an image on the display not being refreshed.

The display device is preferably configured such that the displaying means causes the respective electric potentials of the pixel electrode and of the common electrode to be each equal to the common potential continuously until an image signal is supplied.

The display device is preferably configured such that the displaying means causes the respective electric potentials of the pixel electrode and of the common electrode to be each equal to the common potential continuously until the display device is turned off.

According to the configuration, in a case where an image signal is not supplied even if a control signal has been supplied to the image signal supplying means, the displaying means causes the electric potential of each pixel of the display to be continuously equal to the common potential (which is different from GND level) until (i) an image signal is supplied or (ii) the display device is turned off. This further prevents the deterioration of the components included in the display.

The display device is preferably configured such that: each of pixels included in the display includes a TFT; and the TFT includes a semiconductor layer made of an oxide semiconductor.

The display device is preferably configured such that the oxide semiconductor is IGZO.

Since TFTs made of an oxide semiconductor has excellent off-state characteristics, it is possible to easily set a low refresh rate. That is, it is possible to maintain, for an extended period of time, a state in which an image signal is written into each of the pixels of the display.

Therefore, the suspending period can be set longer. This makes it possible to minimize the number of times the displaying means carries out the refreshing, and therefore allows the display device to reduce electric power consumption.

While the above description discussed embodiments of the present invention, the present invention is not limited to the embodiments, but can be altered in many ways by a person skilled in the art within the scope of the claims. An embodiment derived from a proper combination of technical means disclosed in different embodiments is also encompassed in the technical scope of the present invention.

INDUSTRIAL APPLICABILITY

As described above, a display device of the present invention can be suitably used for television receivers, personal computers, mobile phones, smartphones, tablet PC, and the like.

REFERENCE SIGNS LIST

1 Display device
10 LCD (display)
20 LCD driving section (displaying means)
30 LCD controller (displaying means)
40 CPU (image signal supplying means)
50 Interface

The invention claimed is:
1. A display device comprising:
a display;
a display driver that includes a controller, the display driver causes an image based on an image signal to be displayed on the display; and
an image signal processor that supplies the image signal to the display driver and controller, wherein
the display driver and the controller supply to the image signal processor, a control signal that instructs the image signal processor to supply the image signal,
the image signal processor supplies the image signal in a case where the image signal processor receives the control signal,
in a case where the image signal is not supplied even if the control signal has been supplied to the image signal processor, the display driver supplies the control signal at least one additional time; and
the display driver supplies the control signal to the image signal processor each time a fixed period of time passes.

2. The display device as set forth in claim 1, wherein the display driver supplies the control signal to the image signal processor a plurality of times.

3. The display device as set forth in claim 1, wherein, in a case where the image signal is supplied from the image signal processor without the control signal having been supplied, the display driver refreshes the image in accordance with the image signal thus supplied.

4. The display device as set forth in claim 1, wherein, in a case where the image signal is not supplied even if the control signal has been supplied to the image signal processor, the display driver causes a black image to be displayed on the display at least once.

5. The display device as set forth in claim 4, wherein the display driver causes the black image to be continuously displayed on the display until the image signal is supplied.

6. The display device as set forth in claim 4, wherein the display driver causes the black image to be continuously displayed on the display until the display device is turned off.

7. The display device as set forth in claim 1, wherein, in a case where the image signal is not supplied even if a control signal has been supplied to the image signal processor, the display driver causes an electric potential of each of a plurality of pixels included in the display to be equal to a ground potential at least once.

8. The display device as set forth in claim 7, wherein the display driver causes the electric potential of the each of the plurality of pixels to be continuously equal to the ground potential until the image signal is supplied.

9. The display device as set forth in claim 7, wherein the display driver causes the electric potential of the each of the plurality of pixels to be continuously equal to the ground potential until the display device is turned off.

10. The display device as set forth in claim 1, wherein:
each of a plurality of pixels included in the display includes a pixel electrode and a common electrode; and
in a case where an image signal is not supplied even if the control signal has been supplied to the image signal processor, the display driver causes, at least once, respective electric potentials of the pixel electrode and of the common electrode to be each equal to a common potential which is different from a ground level.

11. The display device as set forth in claim 10, wherein the display driver causes the respective electric potentials of the pixel electrode and of the common electrode to be each equal to the common potential continuously until an image signal is supplied.

12. The display device as set forth in claim 10, wherein the display driver causes the respective electric potentials of the pixel electrode and of the common electrode to each be equal to the common potential continuously until the display device is turned off.

13. The display device as set forth in claim 1, wherein:
each of a plurality of pixels included in the display includes a TFT; and
the TFT includes a semiconductor layer made of an oxide semiconductor.

14. The display device as set forth in claim 13, wherein the oxide semiconductor is indium gallium zinc oxide.

15. A method of controlling a display device,
the display device comprising:
a display;
a display driver that includes a controller, the display driver causes an image based on an image signal to be displayed on the display; and
an image signal processor that supplies the image signal to the display driver;
the method comprising the steps of:
supplying, from the display driver, to the image signal processor, a control signal that instructs the image signal processor to supply the image signal; and
supplying, from the image signal processor the image signal in a case where the image signal processor receives the control signal, wherein
in a case where the image signal is not supplied even if the control signal has been supplied to the image signal processor, the display driver supplies the control signal at least one additional time; and
the display driver supplies the control signal to the image signal processor each time a fixed period of time passes.

16. A display device comprising:
a display;
a display driver that includes a controller, the display driver causes an image based on an image signal to be displayed on the display; and
an image signal processor that supplies the image signal to the display driver and controller, wherein
the display driver and the controller supply to the image signal processor, a control signal that instructs the image signal processor to supply the image signal, the image signal processor supplies the image signal in a case where the image signal processor receives the control signal,
in a case where the image signal is not supplied even if a control signal has been supplied to the image signal processor, the display driver causes an electric potential of each of a plurality of pixels included in the display to be equal to a ground potential at least once.

17. The display device as set forth in claim 16, wherein the display driver supplies the control signal to the image signal processor a plurality of times.

18. The display device as set forth in claim 16, wherein, in a case where the image signal is supplied from the image signal processor without the control signal having been supplied, the display driver refreshes the image in accordance with the image signal thus supplied.

19. The display device as set forth in claim 16, wherein the display driver causes the electric potential of the each of the plurality of pixels to be continuously equal to the ground potential until an image signal is supplied.

20. The display device as set forth in claim 16, wherein the display driver causes the electric potential of the each of the plurality of pixels to be continuously equal to the ground potential until the display device is turned off.

* * * * *